(12) United States Patent
Cone, II

(10) Patent No.: US 8,104,788 B2
(45) Date of Patent: *Jan. 31, 2012

(54) FOLDING STROLLER INCLUDING A FOOTREST

(75) Inventor: Richard E. Cone, II, Athens, OH (US)

(73) Assignee: Dick Cone Industrial Design, Inc., Athens, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/725,226

(22) Filed: Mar. 16, 2010

(65) Prior Publication Data

US 2011/0227373 A1    Sep. 22, 2011

(51) Int. Cl.
  *B62B 7/06* (2006.01)
(52) U.S. Cl. ................ 280/650; 280/642; 280/657
(58) Field of Classification Search .......... 280/642, 280/638, 38, 42, 647, 649, 650, 657, 658, 280/641, 646; 297/16.2, 56
  See application file for complete search history.

(56) References Cited

U.S. PATENT DOCUMENTS

| | | | |
|---|---|---|---|
| 3,736,021 A | 5/1973 | MacLaren | |
| 4,369,986 A | 1/1983 | De la Fé | |
| 4,762,335 A | 8/1988 | Kassai | |
| 6,375,213 B1 | 4/2002 | Suzuki | |
| 6,428,034 B1 | 8/2002 | Bost | |
| 6,464,242 B2 * | 10/2002 | Suzuki | 280/642 |
| 7,178,822 B2 * | 2/2007 | Chen | 280/642 |
| 7,367,580 B2 * | 5/2008 | Iwata et al. | 280/642 |
| 7,641,216 B2 * | 1/2010 | Cone, II | 280/642 |
| 2005/0242548 A1 * | 11/2005 | Hutchinson et al. | 280/642 |
| 2009/0134604 A1 * | 5/2009 | Ohnishi | 280/649 |
| 2009/0200838 A1 | 8/2009 | Cone | |
| 2010/0032926 A1 | 2/2010 | Cone | |

* cited by examiner

*Primary Examiner* — John Walters
(74) *Attorney, Agent, or Firm* — Oblon, Spivak, McClelland, Maier & Neustadt, L.L.P.

(57) ABSTRACT

A folding chair includes handle frames and front and rear legs configured to support the chair in an upright position. The front legs are pivotally attached to the rear legs. The folding chair also includes a footrest positioned between the two front legs. The footrest includes base portions attached to the two front legs and raised portions positioned between the base portions. The slots in the raised portions allow the raised portions to move with respect to the base portions. The footrest is folded as the folding chair is folded.

9 Claims, 25 Drawing Sheets

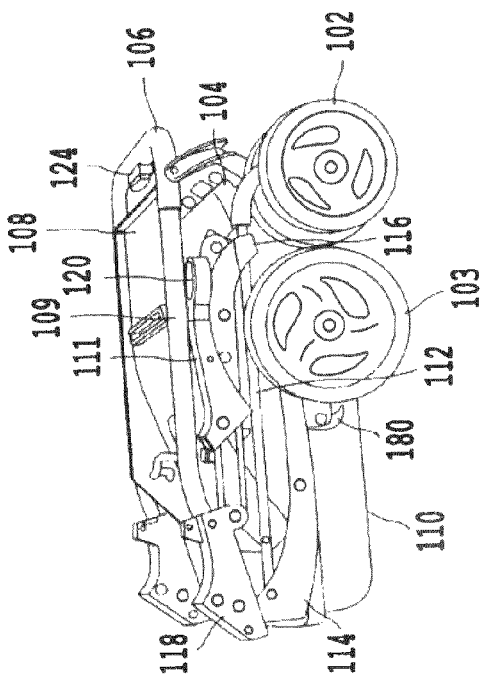
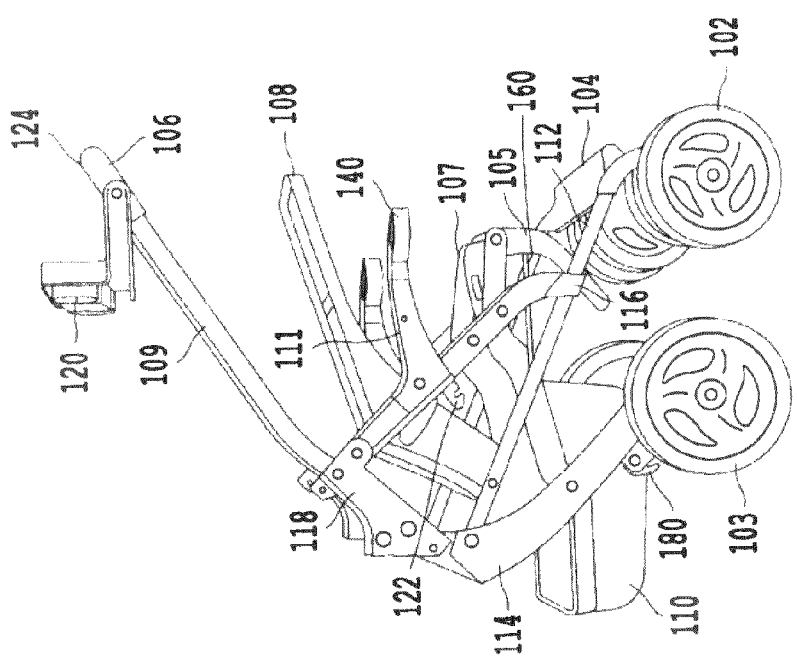
Fig. 9
Fig. 8

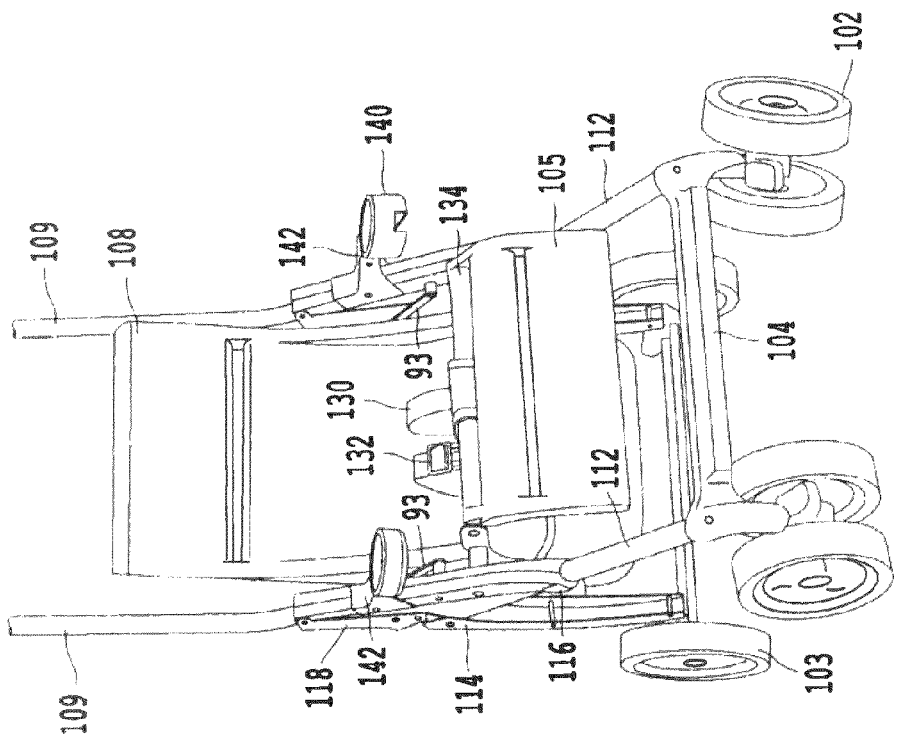
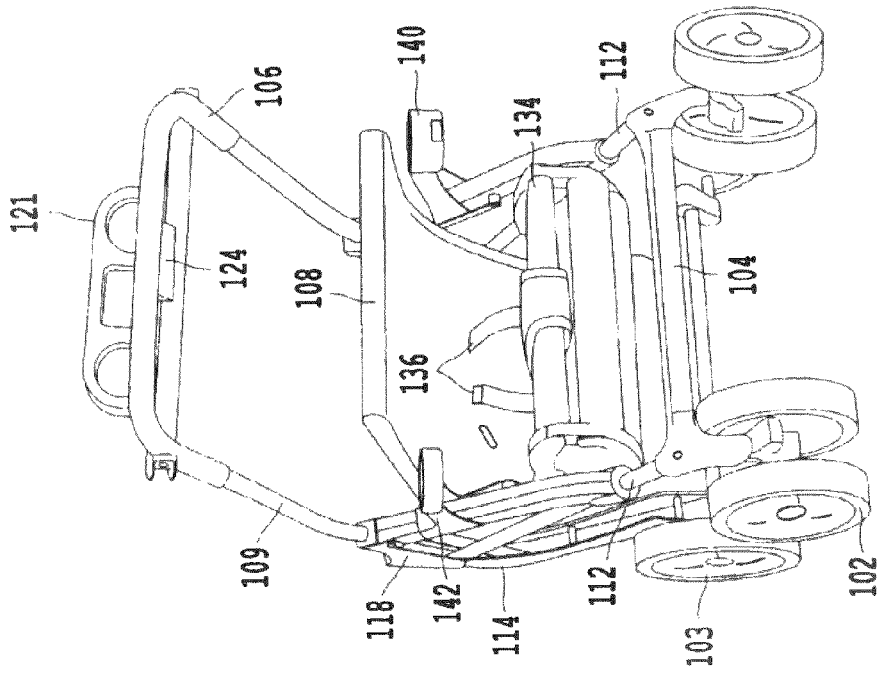
Fig. 10
Fig. 11

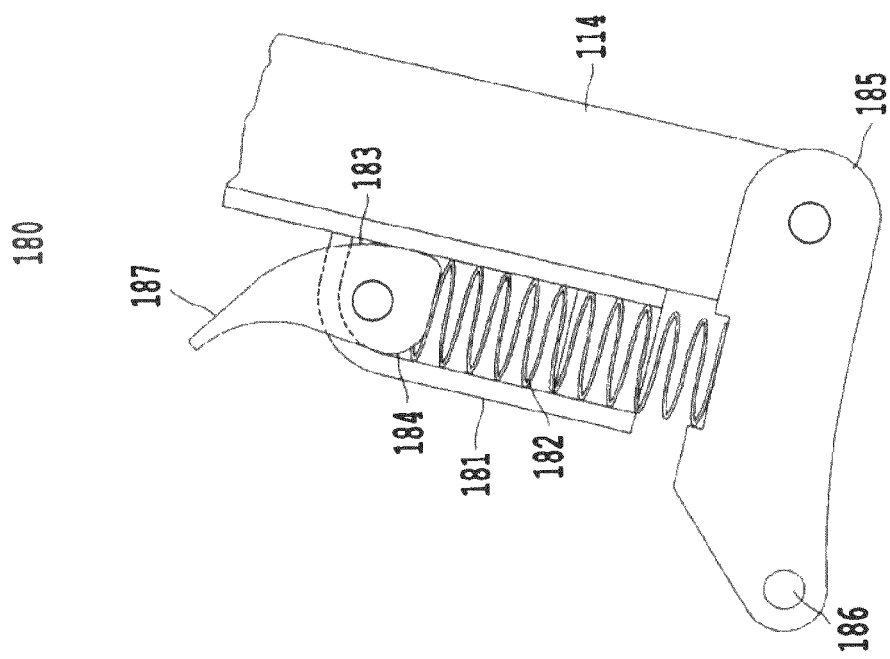
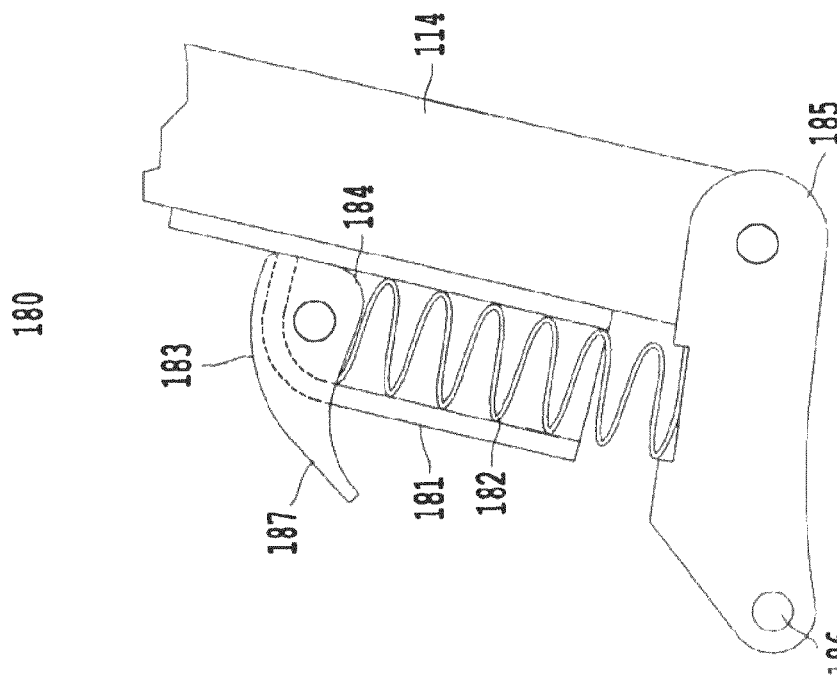

FOLDING STROLLER INCLUDING A FOOTREST

BACKGROUND

Exemplary embodiments of this invention relate to folding chairs, such as strollers, which include a foldable footrest.

Related art folding strollers have been developed to increase portability by reducing a volume of space occupied by the stroller when in its folded state. Reducing the volume of space occupied by the stroller in a folded state allows the stroller to be more easily handled by a user, decreases the amount of space required for storage when not in use and allows for easy transportability by allowing the folded stroller to be easily placed in the trunk of a car, for example. Reduced volume also decreases shipping costs, which is helpful in an era when manufacturing facilities are located globally and individuals utilize the interne to purchase goods.

Related art folding strollers may have a problem that the length of the stroller in its folded state is the same or even greater than when in its unfolded state. A related art stroller, known popularly as the MacLaren stroller and disclosed in U.S. Pat. No. 3,736,021 includes upper and lower X-shaped frame members which allow substantially identical side and leg members to be collapsed to reduce the stroller's width. However, when in a folded state, the length of the stroller increases when the front wheel assembly is pivoted in a direction away from the rear wheels. Also, because the handle portion is pivoted towards the front wheels and extends past the front wheels, the length is extended even more. This increased length in the folded state makes it difficult to store, handle, and transport the stroller. Additionally, the overall cost of the product may be increased due to increased shipping costs.

Some scissor type fold strollers use a flexible strap as a footrest as in MacLaren's stroller, which can be unstable when a child steps on it to climb in the stroller. Other scissor fold strollers use a rigid hinged or pivoting footrest. U.S. Pat. No. 6,375,213 to Suzuki describes such a stroller. The stroller in Suzuki includes a footrest 10 connected to lower portions of two front legs 2. The stroller is a folding type such that the footrest 10 folds upward between the front legs 2. Thus, Suzuki's footrest pivots in line or parallel to the front leg when folded.

Suzuki's footrest is hinged close to the front leg and one portion overlaps the other half. This adds to the length of the footrest and, if it did not fold parallel with the legs, would extend beyond the folded parameters of the stroller. Therefore, the footrest could stretch the seat fabric and prevent the stroller from fully folding. Further, Suzuki's stroller would have to be manufactured with a high standard of tolerance in order for the footrest to fully lie flat when opened for the locking mechanism to engage.

Additionally, Suzuki does not describe how the footrest becomes parallel or in line with the front leg when folded. Based on the drawings, it appears that the footrest must also pivot about the front leg in order to do so.

U.S. Pat. No. 4,762,335 to Kassai and U.S. Pat. No. 4,369,986 to de la Fé also pivot in line or parallel to the front legs when folded. U.S. Pat. No. 6,428,034 to Bost rotates 90 degrees about the front leg when folded.

However, each of these hinged or pivoting footrests require an internal space for the footrest when the stroller is folded. Therefore, the strollers are not as compact as they could be without the footrest. Accordingly, a more compact stroller including a footrest is desired.

SUMMARY

Exemplary embodiments of this invention may include apparatus and methods that provide a folding chair such as a stroller with enhanced portability, that occupies a small volume of space when in a folded state and that is easily handled by a user.

An exemplary folding chair comprises two front legs and two rear legs configured to support the chair in an upright position. A footrest is positioned between the two front legs. The footrest includes base portions attached to the two front legs and raised portions positioned between the base portions. The base portions include pins configured to move in slots in the raised portions.

The folding chair also includes two handle frames, two first upper sliders configured to slide along respective handle frames, an upper X frame including two upper X frame members pivotally connected to each other at respective intermediate portions, each upper X frame member pivotally connected to respective first upper sliders and to respective rear legs, two second lower sliders attached to respective side frames and configured to slide along respective front legs, a lower X frame member including two lower X frame members pivotally connected to each other at respective intermediate portions, each lower X frame member pivotally connected to respective second lower sliders and attached to respective rear legs, and two pivot frames linked to respective second sliders and pivotally attached to respective rear legs.

A base portions of the footrest is fixedly attached to the two front legs at outer ends of the base portions. When the folding chair is in a folded position, the inner ends of the base portions abut.

Each of the base portions of the footrest includes a pin positioned in a slot of the raised portions.

When the folding chair is in an unfolded position, the pins of the base portions abut against outer edges of the slots. When the folding chair is in a folded position, the pins of the base portions abut against inner edges of the slots.

The base portions of the footrest are positioned lower than the raised portions in a vertical direction.

The raised portions are attached via a hinge, and an axis of the hinge is offset and above axes of the pins such that the footrest folds in an upward direction.

An exemplary embodiment of the folding chair also includes lateral portions pivotally attached to the side frames and the rear legs and a seat attached to the lateral portions and the two handle frames. When the folding chair is in the folded position, the seat is also folded.

An exemplary embodiment of the folding chair also includes a canopy frame attached to the two pivot frames. When the folding chair is in the folded position, the canopy frame is also folded.

In another exemplary embodiment, each of the slots is seven-sixteenths of an inch in length.

A method of folding an exemplary embodiment of the folding chair comprises detaching the two lower X frame members from respective rear legs, pivoting a top portion of handle frames toward a front of the chair, sliding first upper sliders upward along respective handle frames and sliding second lower sliders downward along respective front legs so that handle frames, front legs, and rear legs become substantially parallel in their length directions, collapsing the upper X frame member and the lower X frame members about their respective intermediate pivot points so that the two handle frames move toward each other, the two front legs move toward each other and the two rear legs move toward each other, and rotating the two handle frames towards front wheels until inner ends of the base portions abut.

BRIEF DESCRIPTION OF THE DRAWINGS

Various exemplary embodiments will be described in detail, with reference to the following figures, wherein:

FIG. 8 is a schematic side view of the second exemplary embodiment of the stroller of FIG. 6 in a partially folded state;

FIG. 9 is a schematic side view of a second exemplary embodiment of the stroller of FIG. 6 in a completely folded state;

FIG. 10 is a schematic front view of the second exemplary embodiment of the stroller of FIG. 6 in a partially folded state;

FIG. 11 is a schematic front view of the second exemplary embodiment of the stroller of FIG. 6 when beginning to be placed in a folded state;

FIGS. 15A and 15B are schematics of a pre-load mechanism according to an exemplary embodiment;

DETAILED DESCRIPTION OF THE EXEMPLARY EMBODIMENTS

Figure 1:
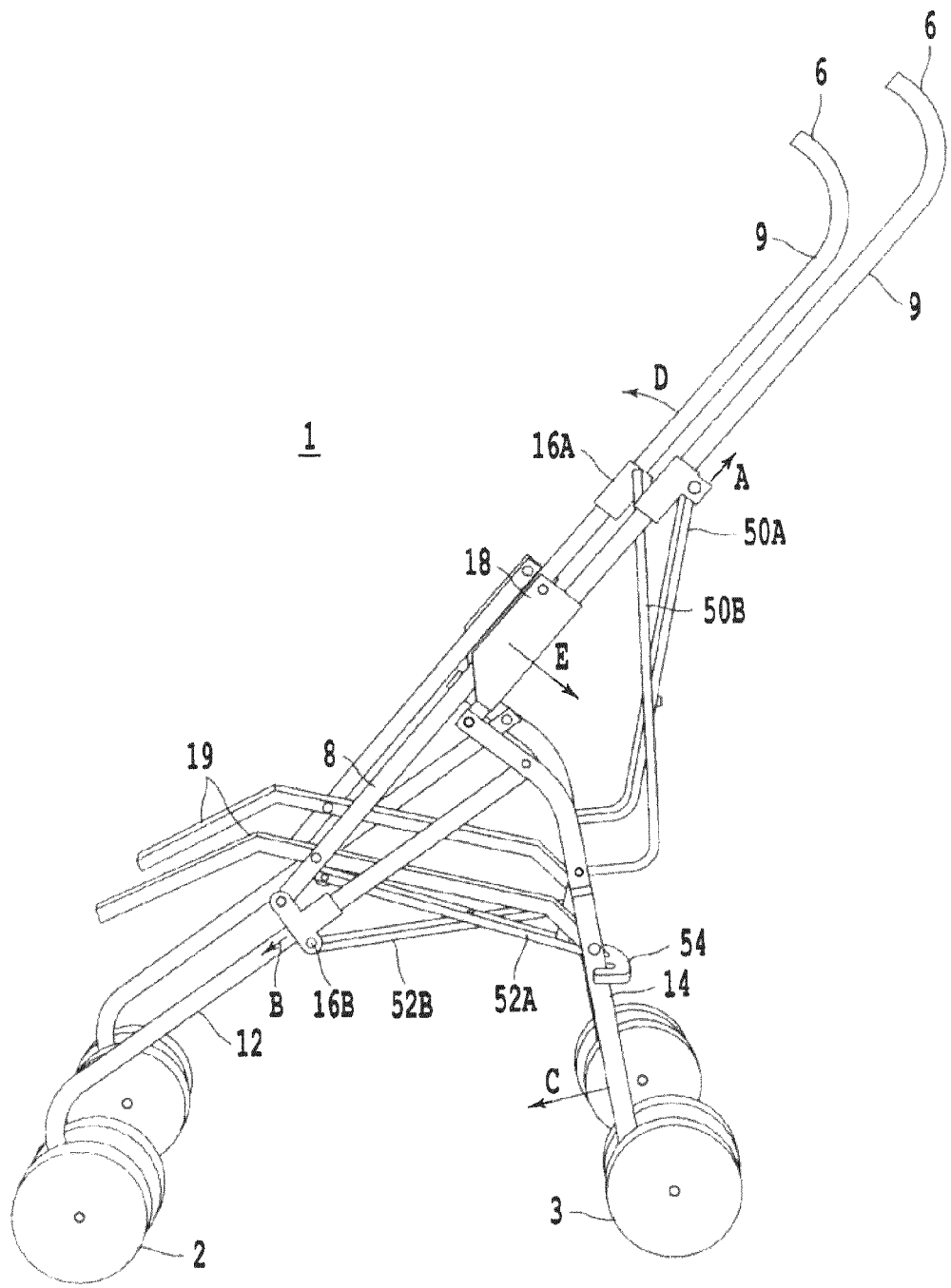
FIG. 1 is a schematic side view of a first exemplary embodiment of a stroller in a completely unfolded state.

FIG. 1 illustrates a side view of a first exemplary embodiment of a stroller in a completely unfolded state. For purposes of clarity to show the elements of the stroller, the sling seat portion of the stroller is not shown in FIGS. 1-4. It should be appreciated by one of ordinary skill that in the following description some components of the stroller are provided in pairs and are identically situated on each side of the stroller. One of ordinary skill should appreciate that although the figures and following description are directed to a stroller the features of the example embodiments may be utilized in any folding chair.

Stroller 1 includes a handle portion 6 located at an end of a handle frame 9. At an end of handle frame 9 opposite from the handle 6, pivot frame 18 is rigidly attached. A portion of handle frame 9 protrudes past pivot frame 18 and is pivotally connected to an end of rear leg 14. An end of rear leg 14, opposite to the end pivotally connected to handle frame 9 has rear wheels 3 rotationally attached. An intermediate portion of rear leg 14 is pivotally attached to one end of front leg 12. An end of front leg 12, opposite to the end pivotally attached to rear leg 14 has front wheels 2 rotationally attached.

Stroller 1 includes sliders 16A, 16B. Slider 16A is slidably attached to handle frame 9. According to an example embodiment, slider 16A has a cylindrical opening through which handle frame 9 is inserted so as to be surrounded by slider 16A. One of ordinary skill would readily appreciate that slider 16A may be configured in any suitable manner to slide or move relative to handle frame 9. In a non-limiting example, handle frame 9 may be configured with a groove while slider 16A is configured with a slot or pin that slides within the groove of handle frame 9.

Slider 16A is pivotally attached to one end of frame members 50A, 50B of upper X frame 50. Frame members 50A and 50B are pivotally attached to each other at an intermediate connection point to form a substantially X shaped frame when the stroller is in a completely unfolded state. The end of each frame member 50A, 50B, opposite to the end pivotally attached to respective slider 16A, is pivotally attached to an intermediate portion of respective rear leg 14.

Slider 16B is slidably attached to front leg 12. According to an example embodiment, slider 16B has a cylindrical opening through which front leg 12 is inserted so as to be surrounded by slider 16B. As discussed with reference to slider 16A above, one of ordinary skill would readily appreciate that slider 16B may be configured in any suitable manner to slide or move relative to front leg 12.

Slider 16B is pivotally connected to one end of side frame 8. An end of side frame 8, opposite to the end connected to slider 16B, is pivotally attached to pivot frame 18. Sling seat (not shown) may be attached to a slider 16A. An intermediate portion of side frame 8 is pivotally connected to lateral portion 19. Lateral portion 19 provides support for a seat portion of a seat disposed on stroller 1. Slider 16B is pivotally connected to one end of frame members 52A, 52B of lower X frame member. Frame members 52A and 52B are pivotally attached to each other at an intermediate connecting portion to form a substantially X shape when in a completely unfolded state. The end of each frame member 52A, 52B opposite to the end pivotally connected to slider 16B is attached to an intermediate portion of rear leg 14, by leg support 54. In a non-limiting example, leg support 54 has grooves which in the completely unfolded state of stroller 1 retain rear leg 14. One of ordinary skill would readily appreciate the leg support 54 may have multiple configurations so long as leg support 54 may be attached to rear leg 14 to maintain stroller 1 in a rigid state and to add lateral stability.

Figure 2:
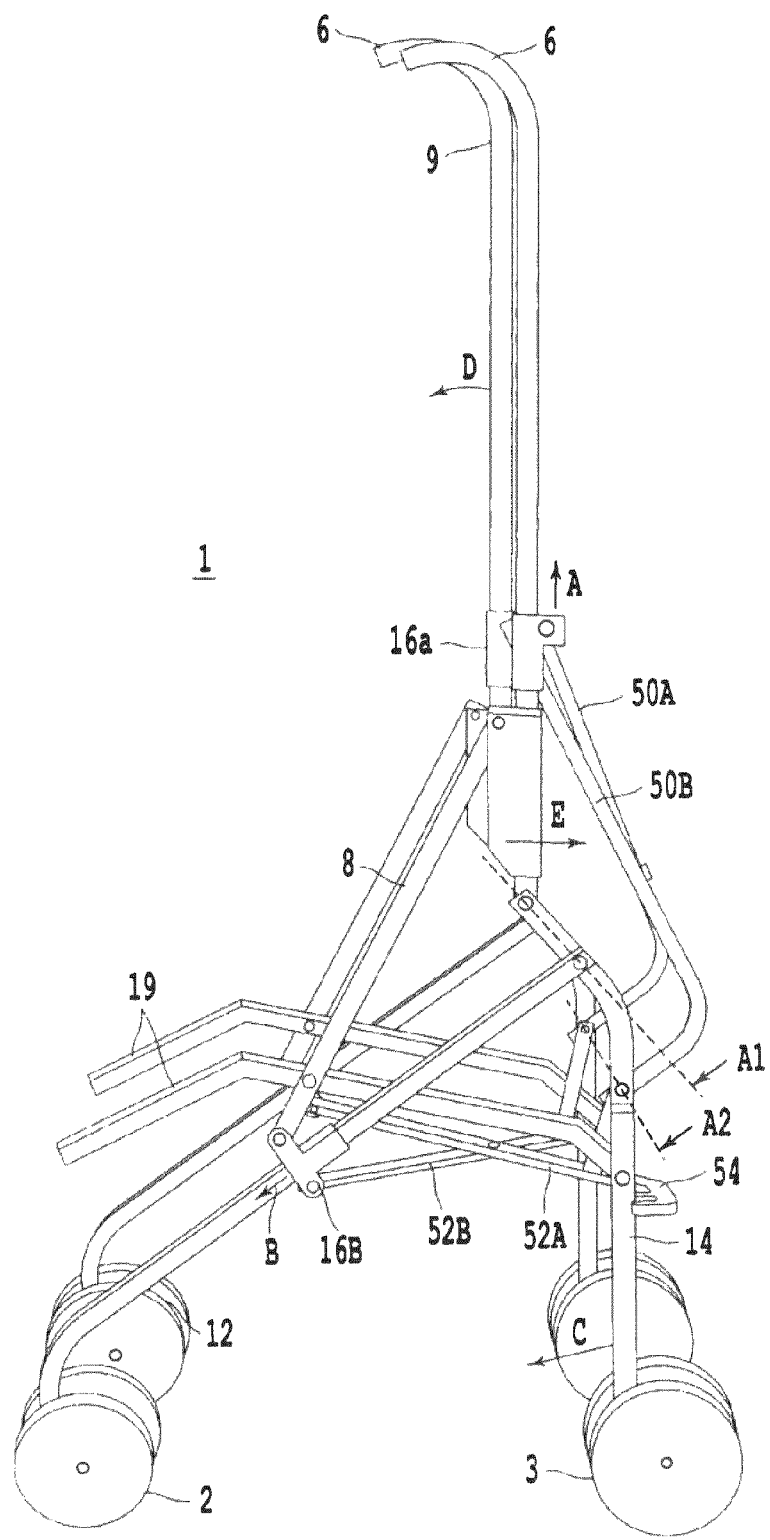
FIG. 2 is a schematic side view of the first exemplary embodiment of the stroller of FIG. 1 when beginning to be placed in a folded state.

An operation to fold stroller 1 will be described with reference to FIGS. 1 and 2. Handle frame 9 is pivoted in a direction as shown by arrow D around axis A1. The axis A1 extends in a width direction of the stroller 1. By pivoting handle frame 9, pivot frame 18 rotates at its pivot point in a direction as shown by arrow E. Through its connection to pivot frame 18, rear legs 14 also pivot around axis A1 in a direction toward front wheels 2, as shown by arrow C. As rear legs 14 pivot, leg support 54 is allowed to disengage from rear legs 14. When leg support 54 is disengaged from rear legs 14, frame members 52A, 52B may be collapsed toward each other around their intermediate connection point so that they move toward being substantially parallel. As frame members 52A and 52B collapse toward each other, the first and second halves of the stroller move toward each other to narrow the width of the stroller.

As handle frame 9 is pivoted in a direction shown by arrow D, slider 16A travels toward handle 6. Frame members 50A and 50B pivot around axis A2 on rear legs 14 as they travel with the slider 16A. As the frame members 50A and 50B pivot, they collapse toward each other around their intermediate connection point so they move toward being substantially parallel. As pivot frame 18 pivots, slider 16B is pushed along front legs 12 toward front wheels 2, through side frame 8 as shown by arrow B. As slider 16B moves toward front wheels 2, frame members 52A and 52B are collapsed toward each other through their respective pivotal connection to slider 16B.

Figure 3:
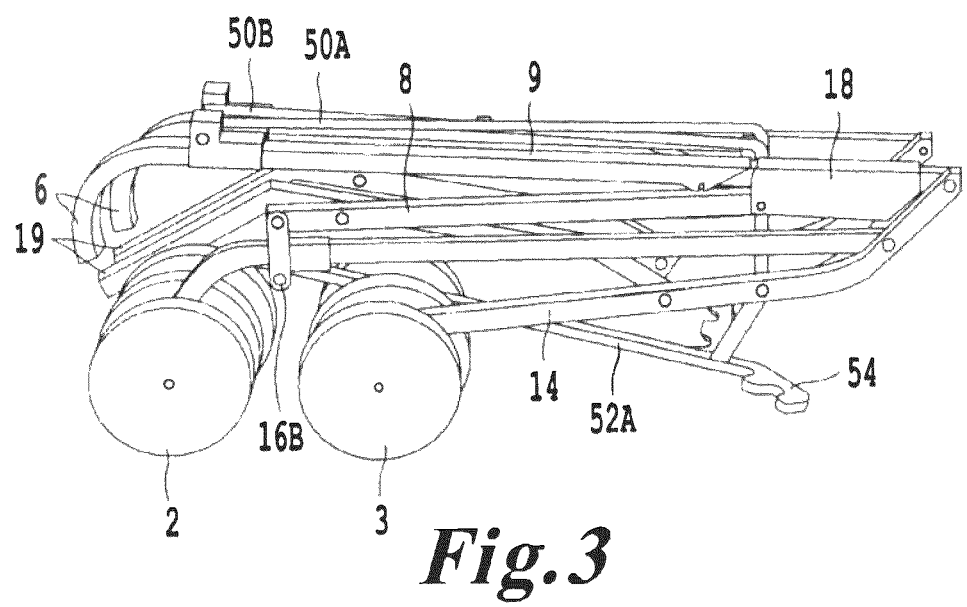
FIG. 3 is a schematic side view of the first exemplary embodiment of the stroller of FIG. 1 in a folded state.
Figure 4:
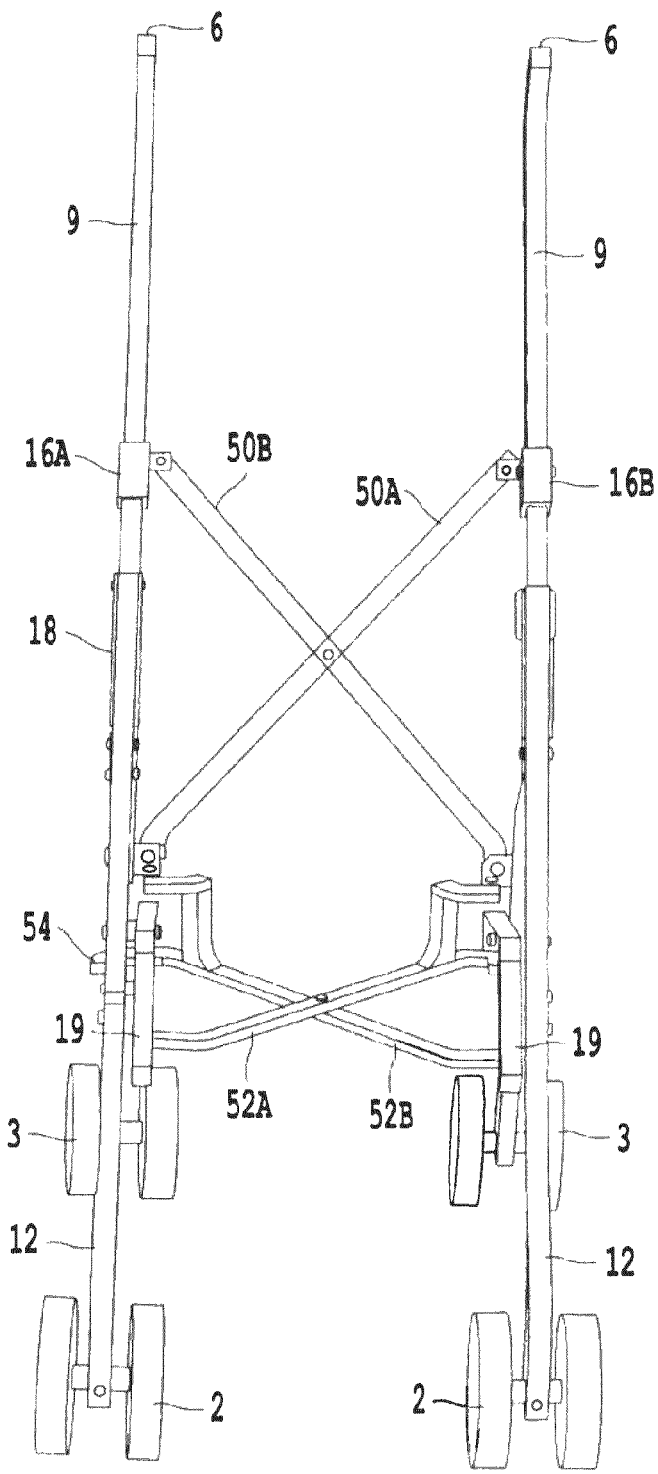
FIG. 4 is a schematic front view of the first exemplary embodiment of the stroller of FIG. 1 in a completely unfolded state.
Figure 5:
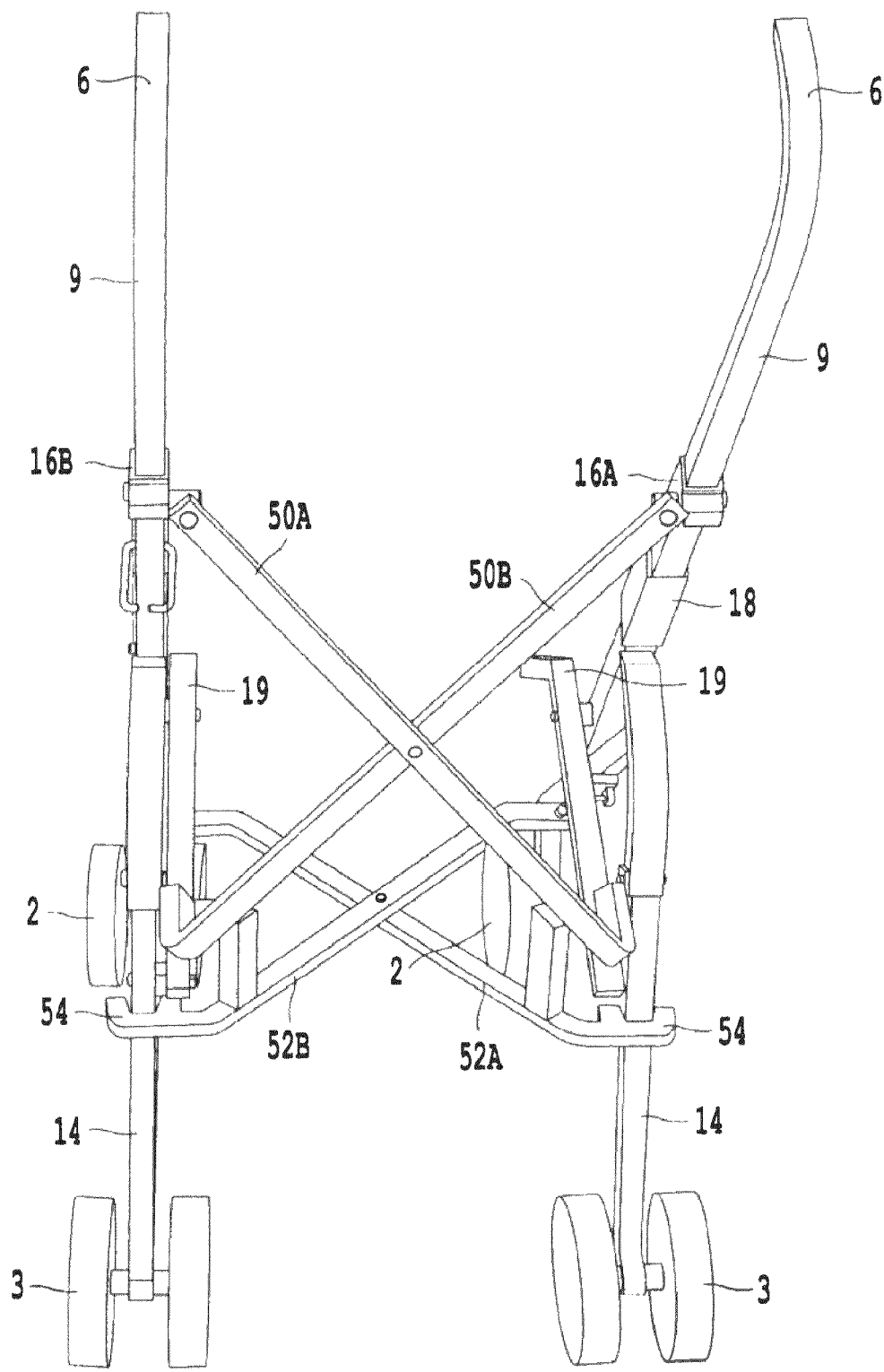
FIG. 5 is a schematic rear view of the first exemplary embodiment of the stroller of FIG. 1 in a completely unfolded state.

In a completely folded state, as shown in FIG. 3, rear wheels 3 move towards the front wheels 2 and are not located on opposites sides of the length of the stroller as in the related art described above. Frame members 50A, 50B are collapsed toward each other to reduce the width of the stroller 1. Front leg 12, rear leg 14, handle frame 9, side frame 8, and lateral portion 19 become substantially parallel to provide a folded stroller 1 which occupies a small volume of space in a length as well as in a width direction.

Figure 6:
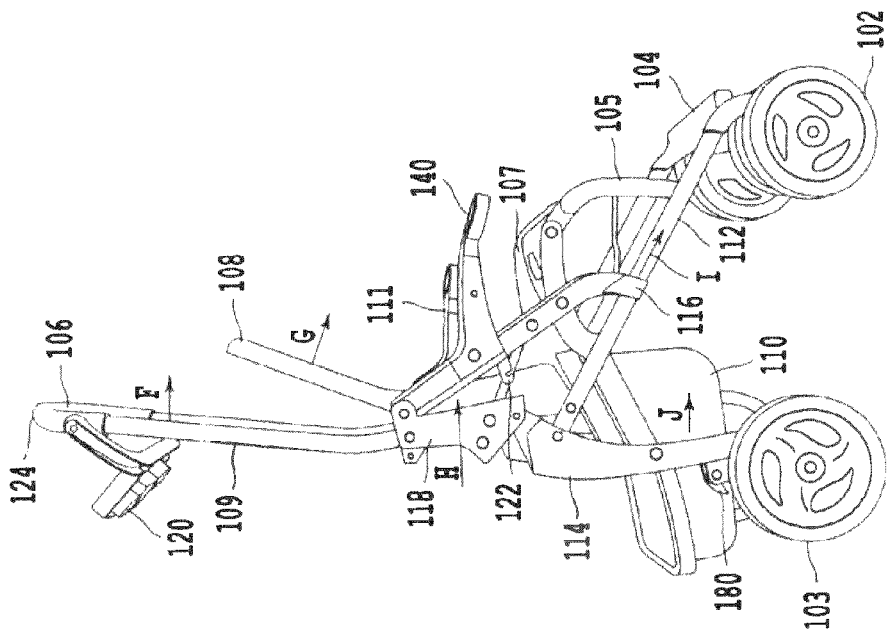
FIG. 6 is a schematic side view of a second exemplary embodiment of a stroller in a completely unfolded state.
Figure 13:
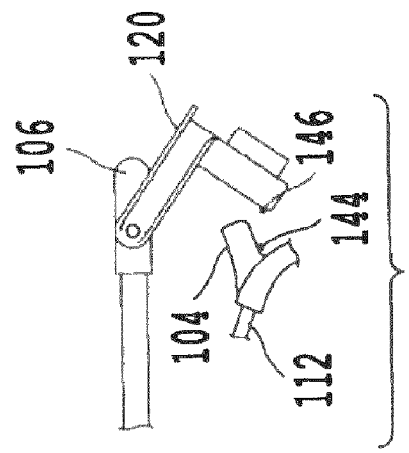
FIG. 13 is a schematic of a pivot lock according to an exemplary embodiment.

FIG. 6 is a schematic side view of a second example embodiment of a stroller in a completely unfolded state. Stroller 2 includes a handle portion 106 located at an end of handle frame 109. As shown in FIG. 13, pivot lock 120 is pivotally attached to handle portion 106. According to an example embodiment, when stroller 2 is in the unfolded state, pivot lock 120 hangs with tray 121 in a substantially horizontal state. Tray 121 may be provided in the form of a storage place such as a cup holder. Pivot lock 120 includes pivot lock lip 146. When stroller 2 is placed in a completely folded state, the pivot lock 120 is pivoted so that the pivot lock lip 146 engages with a corresponding lip 144 located on a lower lateral portion of foot rest 104. By engaging pivot lock lip 146 with lip 144, the stroller 2 may be prevented from becoming unfolded.

At an end of the handle frame 109 opposite from the handle 106, pivot frame 118 is rigidly attached. Rear leg 114 is pivotally attached to pivot frame 118 at one end. At an opposite end of rear leg 114 rear wheels 103 are rotationally attached. Back rest 108 is pivotally attached to front leg 112. Slider 116 is pivotally attached to pivot frame 118. An intermediate portion of slider 116 is pivotally attached to seat 107. An end of the slider 116 that is opposite to the end pivotally attached to the pivot frame 118 is slidably attached to front leg 112. According to an example embodiment, slider 116 has a cylindrical opening which surrounds front leg 112 and slides over front leg 112. However, one of ordinary skill would appreciate that slider 116 may have multiple configurations to slide relative to front leg 112.

Seat 107 includes two parallel lateral portions 119. One end of lateral portion 119 is pivotally attached to leg rest 105. An intermediate portion of lateral portion 119 is pivotally connected to an intermediate portion of slider 116. An end of lateral portion 119 opposite to the end attached to leg rest 105 is pivotally attached to an intermediate portion of rear leg 114. An optional basket 110 can be removably attached to the lateral portions 119.

Front leg 112 is attached at one end to foot rest 104 and at an opposite end to rear leg 114 at an end of rear leg 114 that is opposite to the end that rear wheel 103 is attached to. The front wheels 102 may be rotationally attached to front leg 112.

Figure 7:
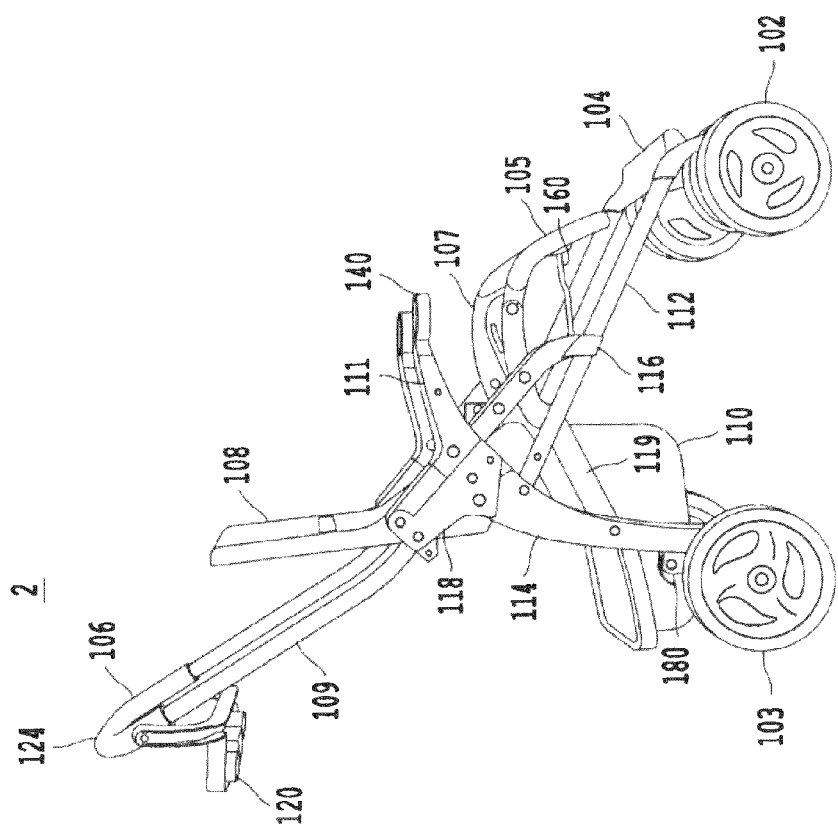
FIG. 7 is a schematic side view of the second exemplary embodiment of the stroller of FIG. 6 when beginning to be placed in a folded state.

An operation to fold stroller 2 will be described with reference to FIGS. 7-9. As shown in FIG. 9, lock release 124 is located to be centered on the handle portion 106. Lock release 124 includes a two step release mechanism. The first step, for example, a push button, allows the second step, for example, two spring loaded squeeze buttons, to be urged toward each other to release latch 122. When latch 122 is released stroller 2 is able to be folded. It should be noted that a release mechanism is required under common safety standards. When latch 122 is in a latched position the stroller may maintain rigidity when in an unfolded state and accidental folding of the stroller when in use may be prevented.

Once the latch 122 has been released from a latched position, the stroller 2 may be folded. Handle frame 109 is pivoted toward the front of the stroller in a direction shown by arrow F in FIG. 7. Handle frame 109 is rigidly connected to pivot frame 118. Thus, pivot frame 118 will also pivot forward as a result of handle frame 109 being pivoted forward as shown by arrow H. As pivot frame 118 is pivoted forward, slider 116 is urged forward through its pivotal connection to pivot frame 118. As shown by arrow I, slider 116 will slide forward along front leg 112. Slider 116 is pivotally connected at an intermediate portion to lateral portion 119, which in turn is pivotally connected to rear leg 114. As slider 116 slides forward along front leg 112, rear leg 114 is pulled forward, as shown by arrow J, via lateral portion 119. Back rest 118, which is pivotally connected to front leg 112 also pivots forward. Leg rest 105 is pivotally connected to wire link 160. Wire link 160 is pivotally attached to front leg 112.

As handle frame 109 continues to pivot forward, the slider 116 slides along the remaining length of front leg 112. As shown in FIG. 9, in a folded position, handle frame 109, slider 116, front leg 112, lateral portion 119 and rear leg 114 are substantially parallel to each other along a length portion of each resulting in a folded chair that occupies a small volume of space, and is easy to handle, transport, and store.

As shown in FIG. 13 when stroller 2 is in a folded state, pivot lock 120 is pivoted around handle 106 so that pivot lock lip 146 engages with lip 144 located on foot rest 104. As discussed above this prevents the stroller 2 from becoming unfolded.

Figure 12:
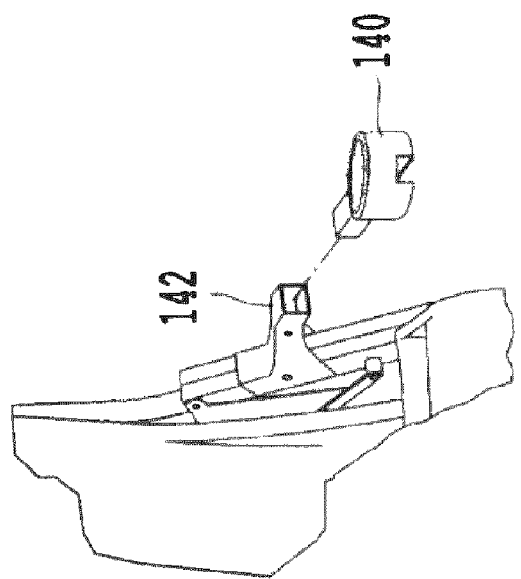
FIG. 12 is a schematic detail of an arm rest according to an exemplary embodiment including an attachment portion.
Figure 14A:
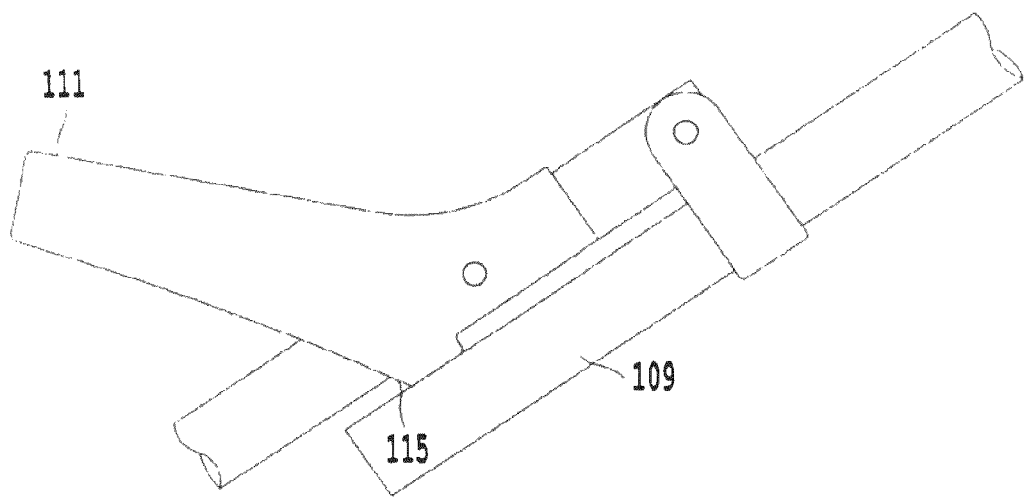
FIGS. 14A and 14B are schematics of an arm rest including an abutment portion according to an exemplary embodiment.
Figure 14B:
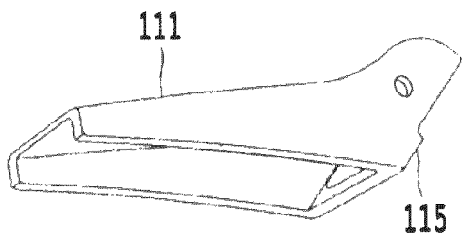

As shown in FIG. 6, arm rest 111 is pivotally attached to slider 116 at one end. As slider 116 slides forward along front leg 112, arm rest 111 pivots toward slider 116. In a folded state arm rest 111 is substantially parallel with slider 116 along the length portion of each. At an end of arm rest 111 opposite the end pivotally attached to the slider, there may be provided an arm rest accessory 140 which may be detachable from arm rest 111. The accessory may be attached to the arm rest 111 in any suitable manner. In an example embodiment shown in FIG. 12, arm rest 111 is provided with a slot 142 through which arm rest accessory 140, shown as a cup holder in FIG. 12 is attached. One of ordinary skill would recognize that arm rest accessory 140 may be configured in any suitable manner, such as for example, a tray provided with slots for each arm rest 111. As shown in FIGS. 14A and 14B, arm rest 111 may include an abutment portion 115 which abuts against pivot frame 118 or in another example embodiment against handle frame 9.

As shown in FIGS. 15A and 15B, a pre-load mechanism 180 may be provided to adjust the ride characteristics of the stroller depending upon the weight of the object or person placed upon the stroller or a desired comfort level. Pre-load mechanism 180 includes a casing 181 with a hollow interior. Resilient member 182 is mounted to be compressible within the casing 181 via cam 183 which includes an abutment surface 184 which abuts one end of resilient member 182. Cam 183 has a pivot handle 187 which is used to pivot cam 183 to compress or decompress resilient member 182. An end of resilient member 182, opposite the end that abuts abutment surface 184 of cam 183 is fixed to an intermediate portion of suspension 185. Suspension 185 is pivotally attached at substantially one end to rear leg 114 and at an opposite end to rear axle 186 which supports rear wheels 103.

An operation of the pre-load mechanism 180 will now be described. In an unloaded state, resilient member 182 is not compressed by action of cam 183. Forces operating on rear wheels 103 are transmitted via axle 186 to suspension 185 which pivots about its pivotal connection with rear leg 114. Resilient member 182 applies a load to suspension 185 which absorbs the forces operating on rear wheels 103 so they are not transmitted to an occupant of the stroller 2 to cause an uncomfortable ride. As an occupant of stroller 2 becomes heavier, resilient member 182 in its uncompressed state may be inadequate to absorb the forces acting on rear wheels 103. By lifting handle 187, cam 183 pivots and abutment portion 184 compresses resilient member 182. In a compressed state, resilient member 182 may absorb forces acting on rear wheels 103 for a heavier load.

As shown in FIG. 6, seat 107, backrest 108, and leg rest 105 together provide the seat portion for an occupant of the stroller. Leg rest 105 is pivotally attached to seat 107. Backrest 108 is pivotally attached to front leg 112. Thus, the sitting position is configured in separate sections which may be foldable relative to each other.

Backrest 108 includes through-holes 136, as shown in FIG. 11. Because seat 107, backrest 108 and leg rest 105 are configured in separate sections, gaps 134 are formed between each section. Belt 130 is provided to retain an occupant of stroller 2 for safety purposes. As shown in FIG. 10, belt 130 includes belt lock 132 to fix the belt to retain an occupant. Belt 130 passes to a rear side of backrest 108 via through-holes 136 and then is passed under the backrest 108 and fixed to an underside of seat 107. As the stroller 2 is moved to a folded state, belt 130 is pulled taut by a movement of seat 107. Belt 130 is pulled from the rear of through-holes 136. Belt 130 is prevented from completely passing through through-holes 136 by belt lock 132, which is made larger than the through-holes 136. In a folded state, belt lock 132 is held against backrest 108 and prevented from falling between gaps 134. If belt lock 132 falls into gaps 134 it could become damaged due to compression between the folded portions of the stroller.

Figure 16:
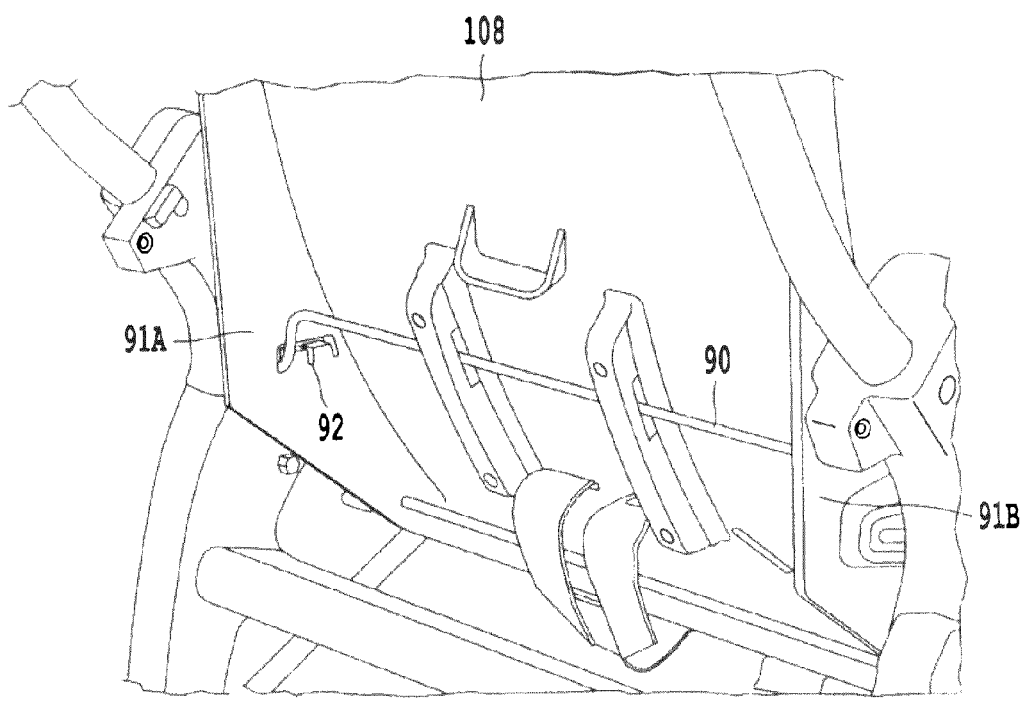
FIG. 16 is a schematic of a rigid memory back according to an exemplary embodiment.

As shown in FIG. 16, backrest 108 includes a rigid memory back feature which provides backrest 108 with a set incline in an unfolded state, that after the stroller is folded and unfolded, maintains the backrest in the previously set incline. Backrest 108 includes a recline pivot bar 90 which supports backrest 108 from the rear. Recline pivot bar 90 passes through flanges 91A, 91B located to protrude rearwardly from backrest 108. Flanges 91A, 91B are provided with through-holes which include adjustment grooves 92. Recline pivot bar 90 is biased via a resilient member to engage with grooves 92 to provide recline positions for backrest 108. Recline pivot bar 90 passes through flanges 91A, 91B and is pivotally attached to an end of link 93. Another end of link 93, opposite to the end attached to recline pivot bar 90 is pivotally attached to an intermediate portion of slider 116. As pivot frame 118 pivots and slider 116 moves along front leg 112, backrest 108 pivots while recline pivot bar 90 remains in engagement with a selected adjustment groove 92. In a folded state, recline pivot bar 90 remains engaged with the selected adjustment groove 92. When stroller 2 is returned to an unfolded state recline pivot bar 90 is still engaged with the selected adjustment groove 92 to provide the rigid memory back feature.

Figure 17:
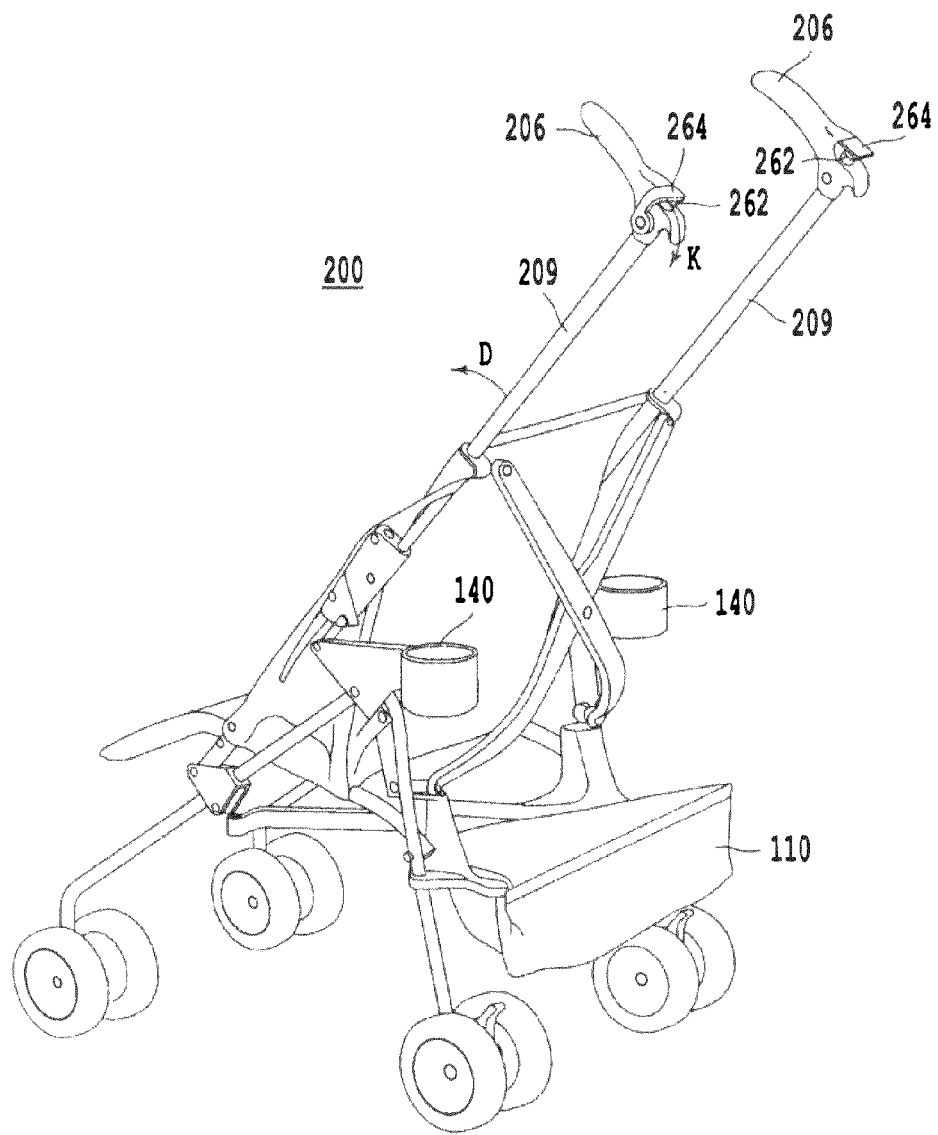
FIG. 17 is schematic side view of an exemplary embodiment of a stroller in a completely unfolded state.

Another exemplary embodiment of a stroller is shown in FIG. 17. The embodiment shown in FIG. 17 is similar to the embodiment shown in FIGS. 1-5. Therefore, duplicative descriptions will be omitted.

Figure 17A:
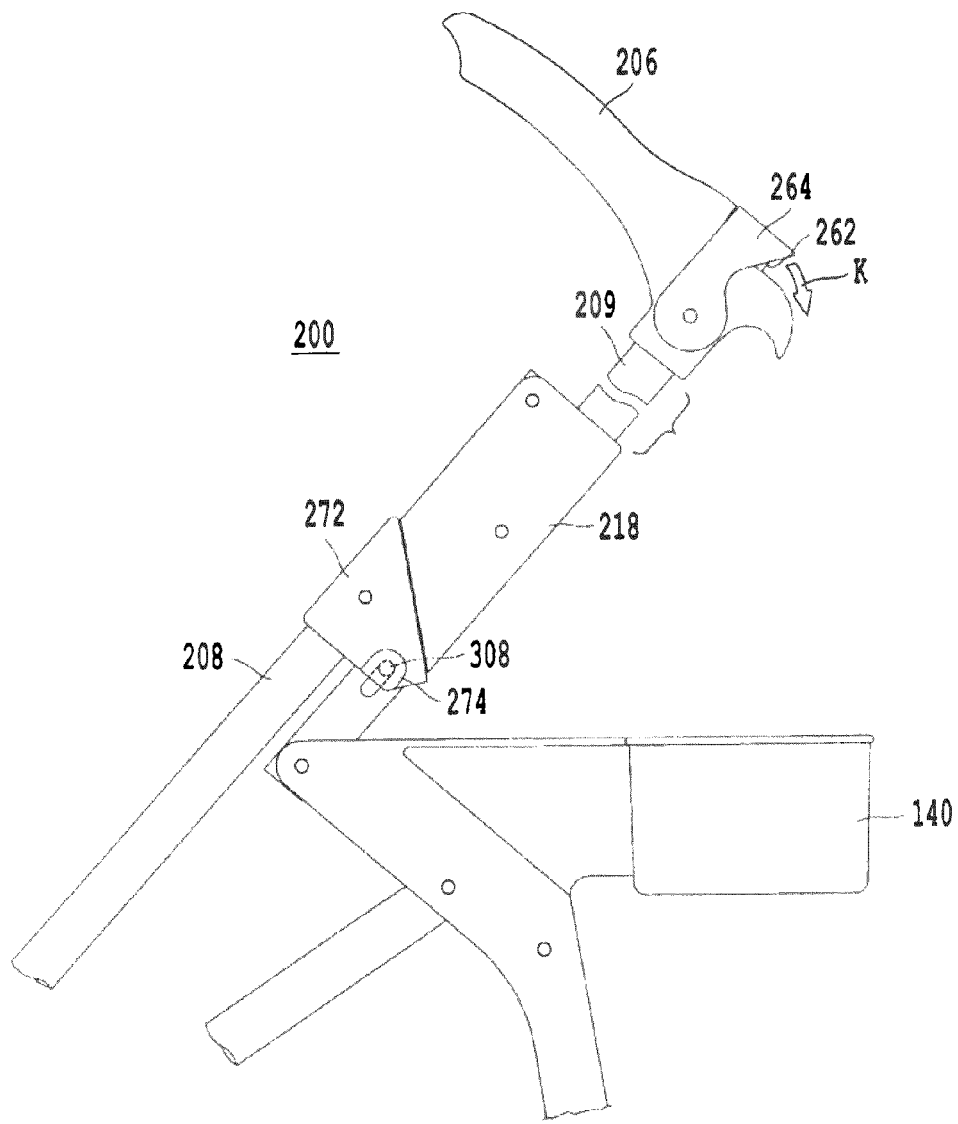
FIG. 17A is a view of a portion of the stroller of FIG. 17.
Figure 18:
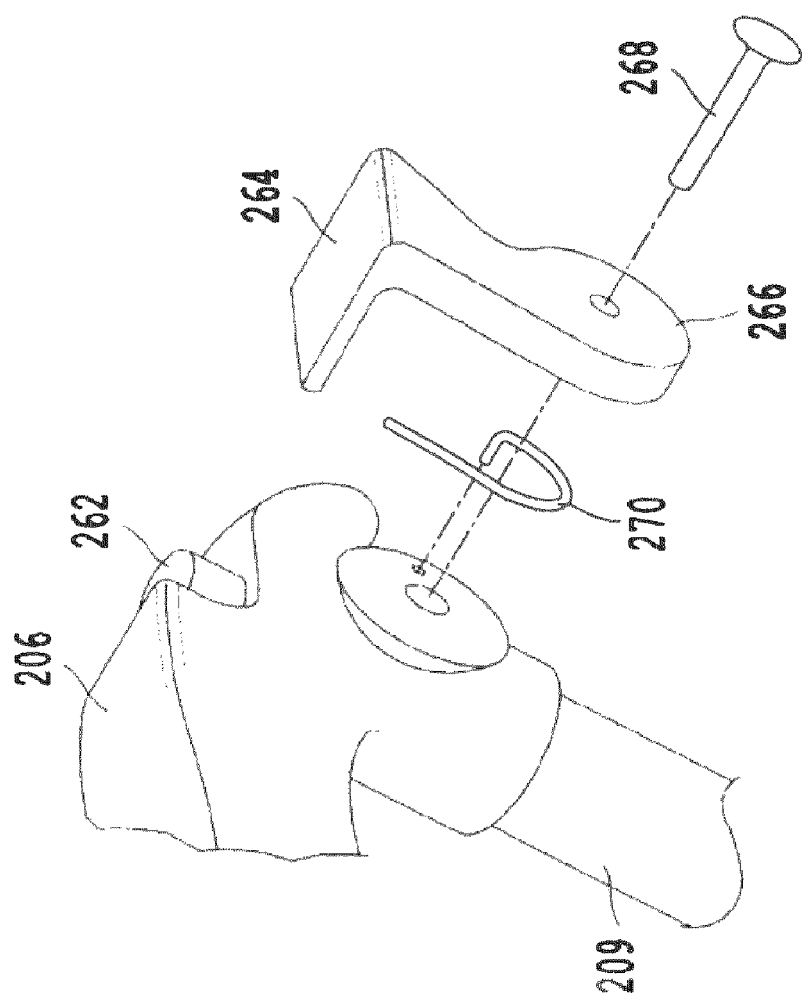
FIG. 18 is a view of a portion of the stroller of FIG. 17.

As shown in FIG. 17 and as shown in greater detail in FIG. 17A, a stroller 200 includes a handle 206 located at an end of a handle frame 209. A lock release button 262 is positioned on the handle 206. The lock release button 262 can have a button cover 264 positioned to prevent the lock release button 262 from being accidentally pressed. The button cover 264 can be rotated in the direction of arrow K in order to access the lock release button 262. As shown in FIG. 18, the button cover 264 can include a cover member 266 that is attached to the handle 206 with a rivet 268. Additionally, a spring 270 can bias the cover member 266 to a position covering the lock release button 262 to prevent the lock release button 262 from being accidentally pressed.

Figure 19:
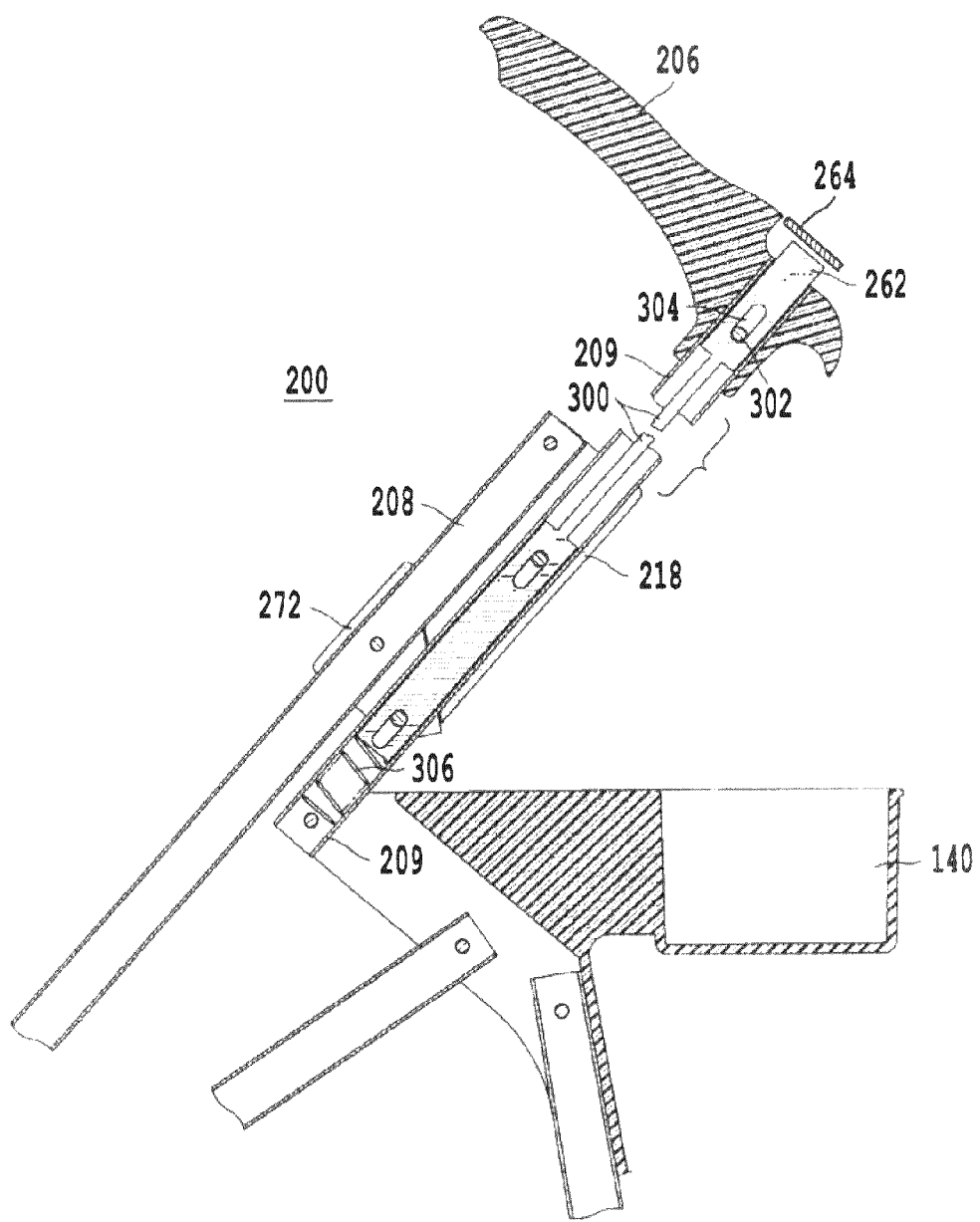
FIG. 19 is a sectional view of a portion of the stroller of FIG. 17.

As shown in FIG. 19, the lock release button 262 is positioned on an end of a locking rod 300. The locking rod 300 is located within the handle frame 209. The locking rod 300 is movably positioned within the handle frame 209 via rivets 302. The rivets 302 pass through holes 304 in the locking rod 300. The holes 304 in the locking rod 300 are bigger than a diameter of the rivets 302 such that the locking rod 300 can travel a limited distance within the handle frame 209. A compression spring 306 positioned at an end of the handle frame 209 opposite to the lock release button 262 provides a biasing force to the locking rod 300 such that the lock release button 262 returns to an extended state when the lock release button 262 is not being pressed. Additionally, a folding prevention pin 308 is attached to the locking rod 300 and extends outside of the handle frame 209.

As shown in FIG. 17A, a pivot frame 218 is rigidly attached at an end of the handle frame 209 opposite from the handle 206. In an unfolded position, the pivot frame 218 abuts against a housing member 272 rigidly connected to an end of a side frame 208. The housing member 272 includes a raised portion 274 which surrounds the folding prevention pin 308 when the stroller 200 is in the unfolded position such that the folding prevention pin 308 will contact the raised portion 274 if force is applied to the handle 206 or handle frame 209. Thus, the raised portion 274 prevents the folding prevention pin 308 from moving in the folding direction and keeps the stroller 200 from being folded without the lock release button 262 being pressed. As a result, accidental folding of the stroller 200 can be prevented.

A process of unlocking of the stroller 200 in order to fold the stroller 200 will now be described.

In order to fold the stroller 200, the lock release button 262 must be pressed. To access the lock release button 262, the button cover 264 is rotated in the direction of arrow K to allow access to the lock release button 262. Then, the lock release button 262 is pressed, pushing the locking rod 300 downward and compressing the compression spring 306. When the locking rod 300 is pushed downward, the folding prevention pin 308 translates downward through an opening of the raised portion 274 of the housing member 272. Thus, the folding prevention pin 308 is no longer surrounded by the raised portion 274 of the housing member 272.

Figure 20:
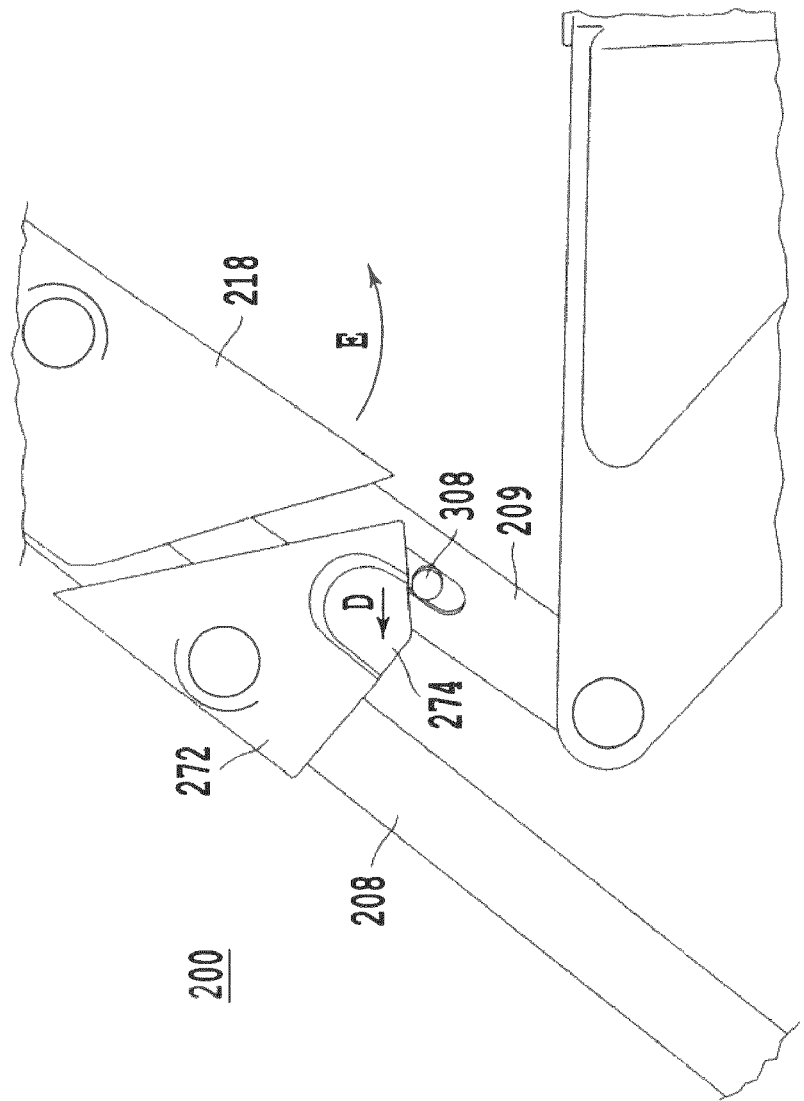
FIG. 20 is a schematic view of a portion of the stroller of FIG. 17 in a slightly folded state.

Next, while the folding prevention pin 308 is no longer surrounded by the raised portion 274, the handle frame 209 is pivoted in a direction as shown by arrow D in FIG. 17. By pivoting the handle frame 209, the pivot frame 218 rotates at its pivot point in a direction as shown by arrow E in FIG. 20. Thus, the pivot frame 218 is separated from the housing member 272. Once the pivot frame 218 is separated from the housing member 272, the lock release button 262 can be released. When the lock release button 262 is released, the biasing force from the compression spring 306 will cause the locking rod 300, the folding prevention pin 308, and the lock release button 262 to return to their original positions. However, because the pivot frame 218 was separated from the housing member 272, the folding prevention pin 308 will not be restricted by the raised portion 274 of the housing member 272, and the stroller 200 can continue to be folded.

The remaining steps for folding the stroller 200 are similar to those described with respect to FIGS. 1-5. Thus, the duplicative description will be omitted.

As can be seen in FIG. 17, the stroller 200 may include at least one rearward-facing cup holder 140. Additionally, as described above, alternative accessories could be attached to the stroller 200 in place of the cup holder 140. Further, a basket 320 can be removably attached to the stroller 200.

FIG. 17 shows a lock release button 262 on each of the handles 206. However, in an alternative embodiment, only one lock release button 262 may be provided. Additionally, while FIG. 17 shows two handle frames 209, the lock release button 262, and the accompanying locking mechanism could be provided with a handle 106 similar to that described with respect to FIG. 6.

Figure 21:
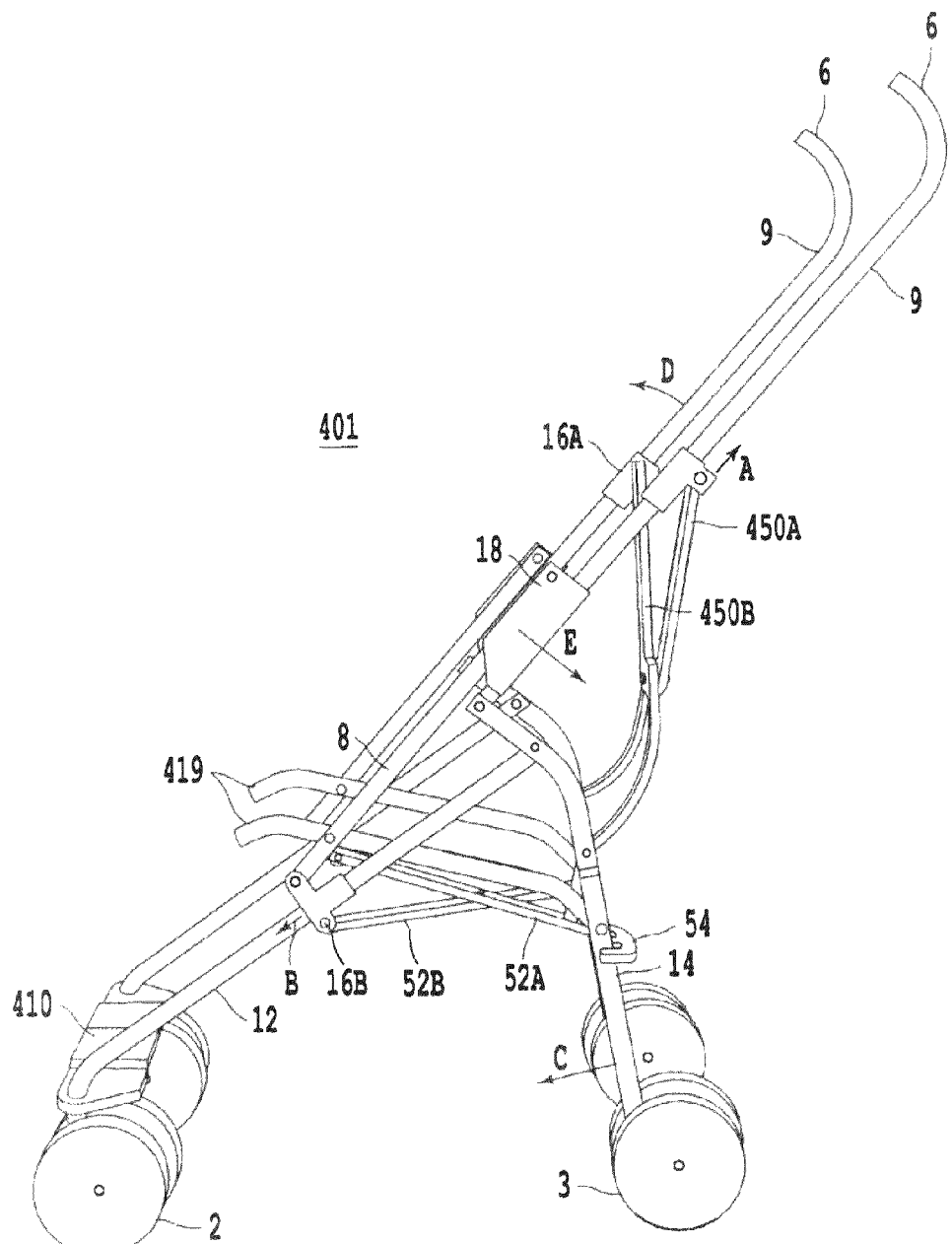
FIG. 21 is a schematic side view of another exemplary embodiment of a stroller in a completely unfolded state.

Another exemplary embodiment of a stroller is shown in FIG. 21. The embodiment shown in FIG. 21 is similar to the embodiment shown in FIGS. 1-5 and 17. Therefore, duplicative descriptions will be omitted.

The stroller 401 includes a footrest 410 positioned between the front legs 12. The footrest 410 is attached to each of the front legs 12 by a footrest mount 414 that surrounds the front legs 12 and is held in place by the bend in the front legs 12 and front wheel swivel assembly. Since each footrest mount 414 is attached below the bend on the front leg 12 of the stroller 401, the slider 16A can slide along the entire length of the front leg 12.

The stroller 401 shown in FIG. 21 includes curved lateral portions 419 that are shorter than the lateral portions 19 of the stroller 1 shown in FIG. 1. Thus, the seat 460 (FIG. 27) can be shorter such that the leg rest portion of the seat is removed. Instead, a child riding in the stroller 401 can place his or her feet on the footrest 410.

Figure 27:
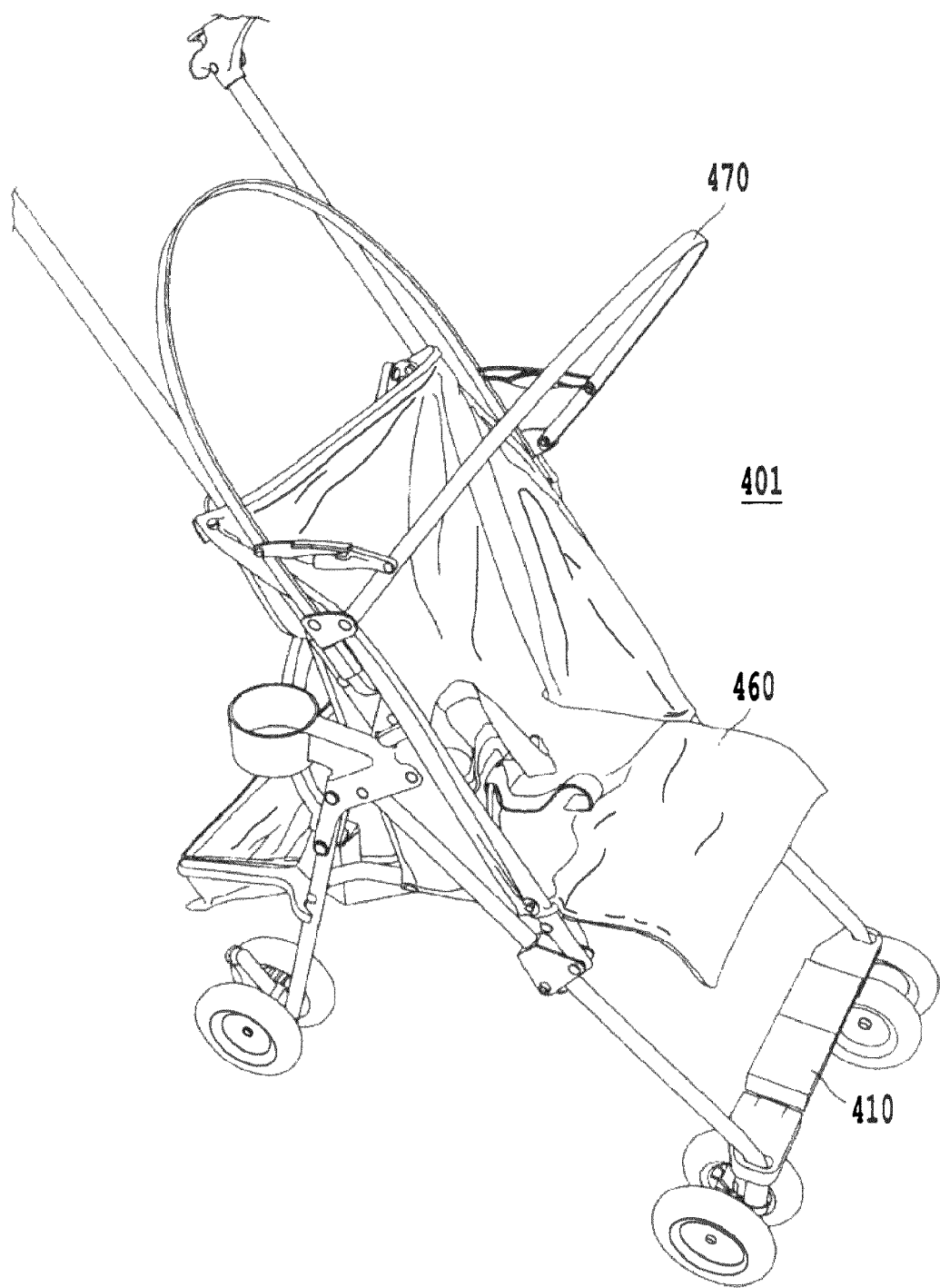
FIG. 27 is a schematic side view of another exemplary embodiment of a stroller in a completely unfolded state.

The base of the seat 460 is attached to the lateral portions 419 by a pocket in the seat 460 that slips over the front of the tubing of the lateral portions 419. The seat 460 is held in place by known fixing means, for example, two screws and washers on both sides of the lateral portions 419. The sides of the seat 460 are attached to side frame 8 by known fixing means, for example, one screw and a washer. The back of the seat 460 is attached to upper sliders 16A. The base and back of the seat are one piece, as shown in FIG. 27.

Figure 23:
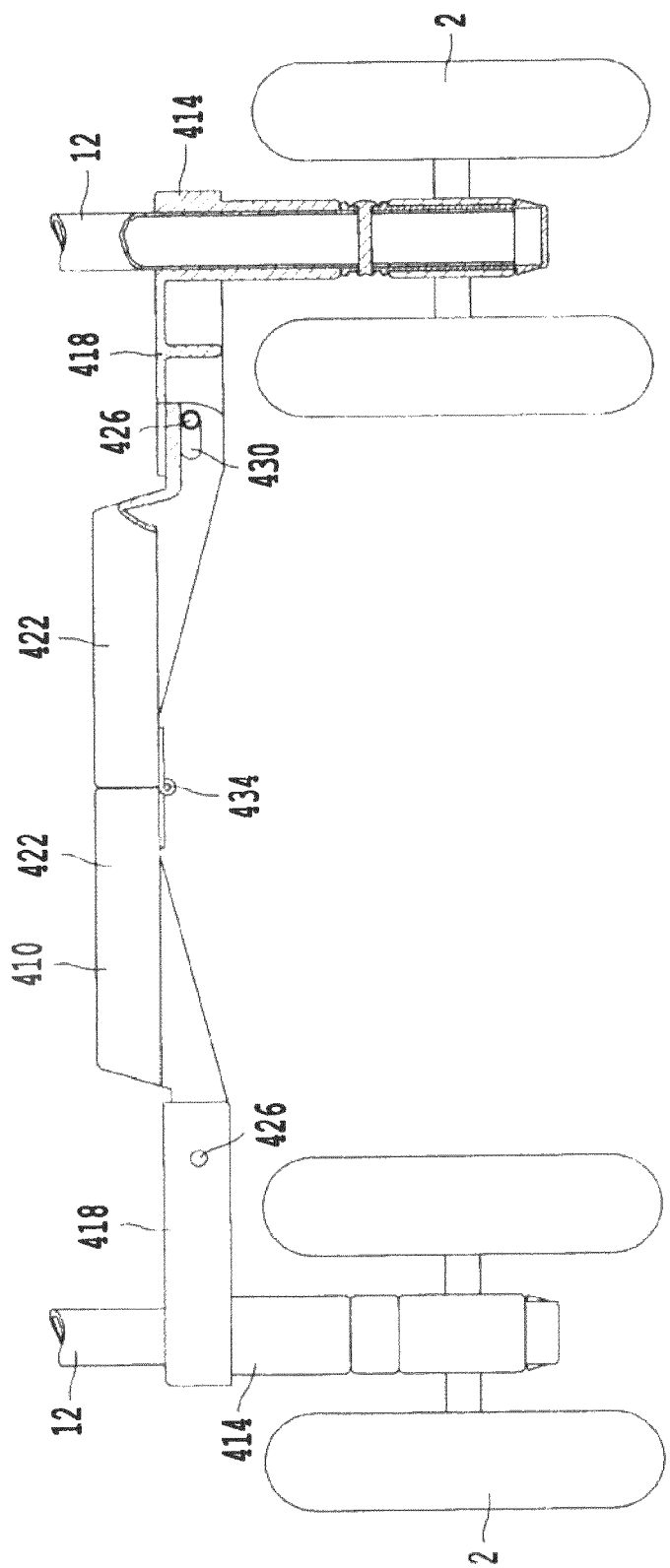
FIG. 23 is a detailed view of a portion of the stroller of FIG. 21.
Figure 24:
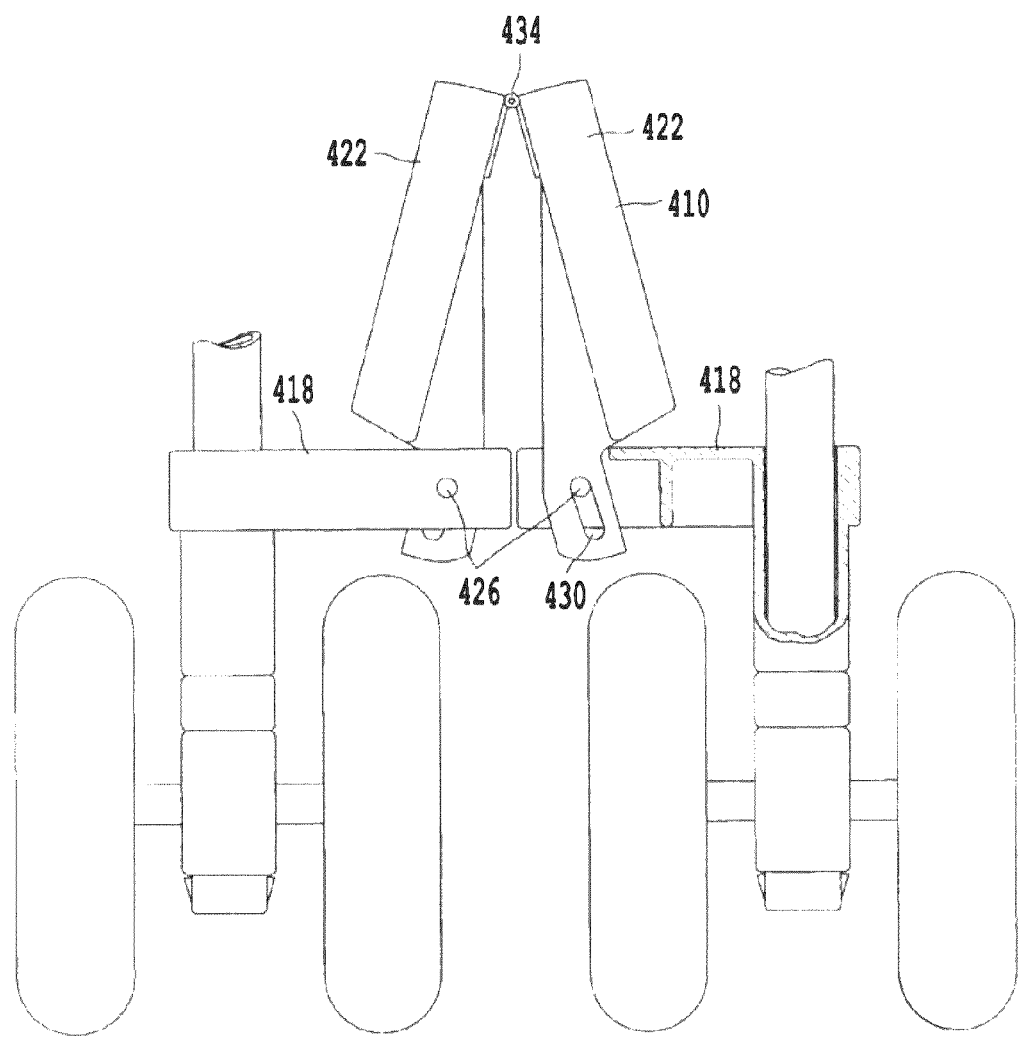
FIG. 24 is another detailed view of a portion of the stroller of FIG. 21.

As can be seen in FIG. 23, the footrest 410 includes base portions 418 that extend from the footrest mounts 414. Outer ends of the base portions 418 are fixedly attached to the footrest mounts 414, and thus do not pivot when the stroller 401 is being folded. Further, when the stroller 401 is being folded, inner ends of the base portions 418 will abut, as shown in FIG. 24.

The raised portions 422 of the footrest 410 are attached to one another by a hinge 434. The raised portions 422 pivot around an axis of the hinge 434 when the stroller 401 is folded and unfolded.

Raised portions 422 of the footrest 410 are also attached to each of the base portions 418. In the unfolded state, the raised portions 422 are positioned above the base portions 418. Thus, the footrest 410 provides two different heights at which a child in the stroller 401 can rest his or her feet. Specifically, the raised portions 422 allows a child with shorter legs to comfortably reach the footrest 410 whereas the base portions 418 can be more comfortable for a child with longer legs.

Each of the base portions 418 includes a pivot pin 426 that extends through a slot 430 in the respective raised portions 422. The pivot pins 426 have a smaller diameter than a length of the slots 430. Thus, the pivot pins 426 can move within the slots 430 to allow for manufacturing tolerances and flex of the front legs 12. In one embodiment, each of the slots 430 has a length of seven-sixteenths of an inch. Thus, the front legs 12 can flex towards one another in the length direction of the slots 430 by a total of seven-eighths of an inch before the pivot pins 426 contact the edge of the slots 430, causing the footrest 410 to rise. Accordingly, the stroller 401 can fully support the child while allowing for a more comfortable ride due to the increased flexibility. Other slot lengths that allow the same flexibility and movement of the raised portions are also envisioned.

The length of the slots 430 was chosen such that the raised portions 422 of the footrest 410 do not interfere with the rotation of the front wheels 2 when folding. Slots that are big enough to allow the back of the raised portions 422 of the footrest 410 to hit the front wheels 2 during folding stops the footrest 410 from completely folding, and thus binds up the stroller 401.

Figure 25:
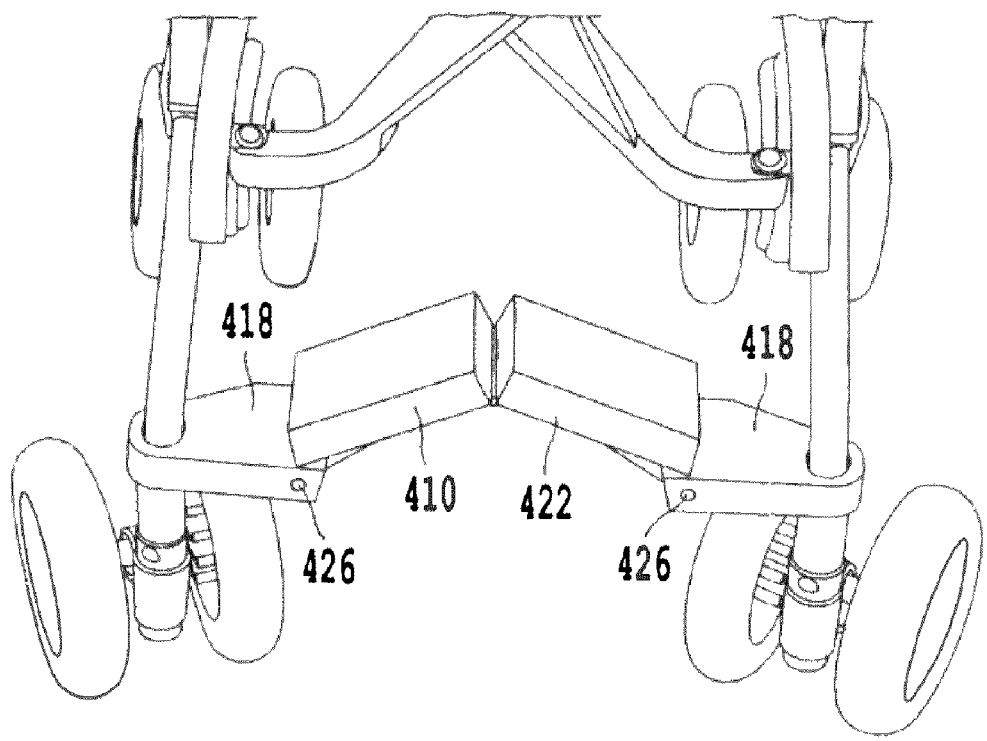
FIG. 25 is another detailed view of a portion of the stroller of FIG. 21.

As can be seen in FIG. 23, when the stroller 401 is in the unfolded state, the pivot pins 426 abut against the outer edges of the slots 430. When the stroller 401 begins to fold such that the front legs 12 move inward towards one another by more than seven eighths of an inch, the pivot pins 426 contact the inner edges of the slots 430 and cause the footrest 410 to rise as shown in FIG. 25 by pivoting around axes of the pivot pins 426. The footrest 410 folds parallel or in line with the bottom of the tubing of the front leg 12, which is vertical to the ground. This is done in order to clear upper X frame members 450A, 450B within the stroller 401.

The pivot pins 426 on the footrest base portions 418 are moved inward from the front legs 12 such that the base portions 418 touch each other when folded. This reduces the length of the raised portions 422 as well as the height when folded. The slots 430 also help reduce the height. Further, by moving the pivot pins 426 away from the front legs 12, room is provided for the slots 430 of the raised portions 422 to travel on the pins 426 and not hit the front legs 12. Accordingly, the height of the footrest 410 can be reduced when folded.

As can be seen in the folded position shown in FIG. 24, because the pivot pins 426 have moved towards the inner edges of the slot 430, the ends of the raised portions 422 of the footrest 410 do not protrude as far upward as they would without the slots. Thus, the footrest 410 will cause less wear on the seat 460 (see FIG. 28) and be less likely to puncture the seat 460. Further, the stroller 401 will have a smaller overall size when folded, allowing for more convenient transportation and storage.

Figure 22:
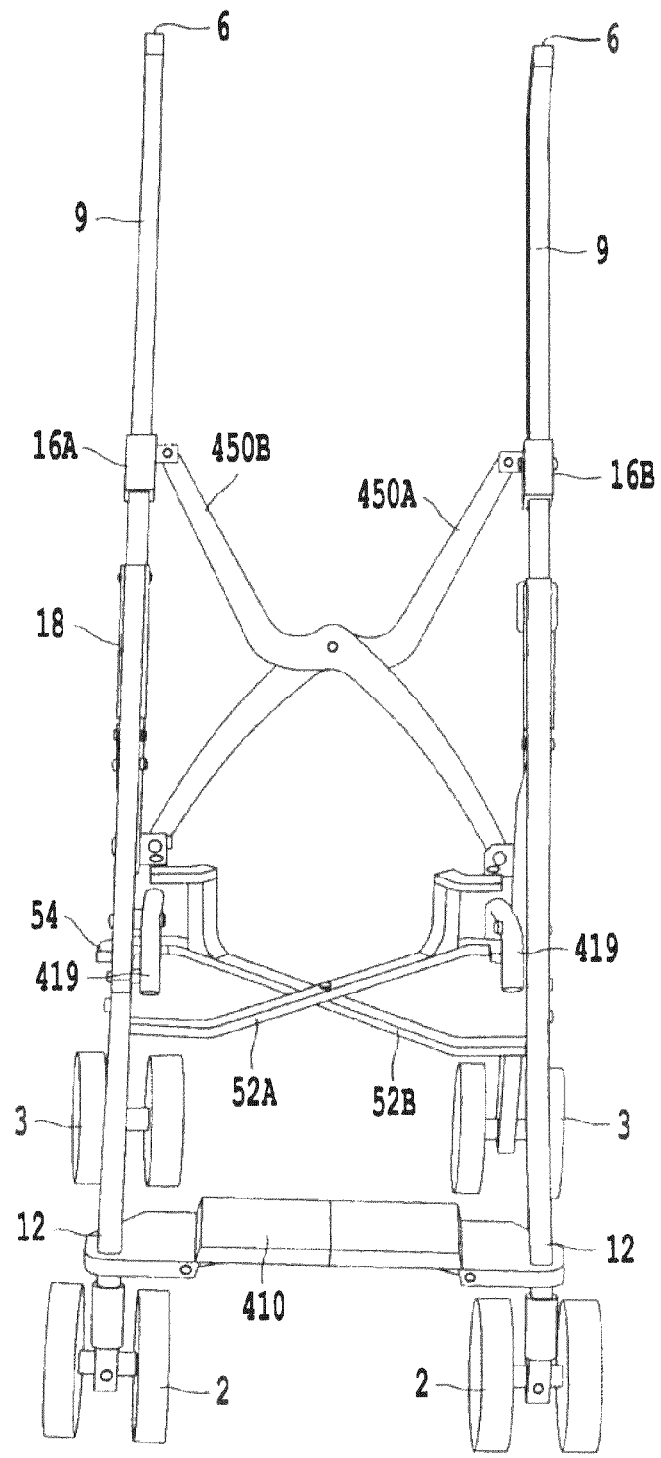
FIG. 22 is a schematic front view of the exemplary embodiment of the stroller of FIG. 21 in an unfolded state.
Figure 26:
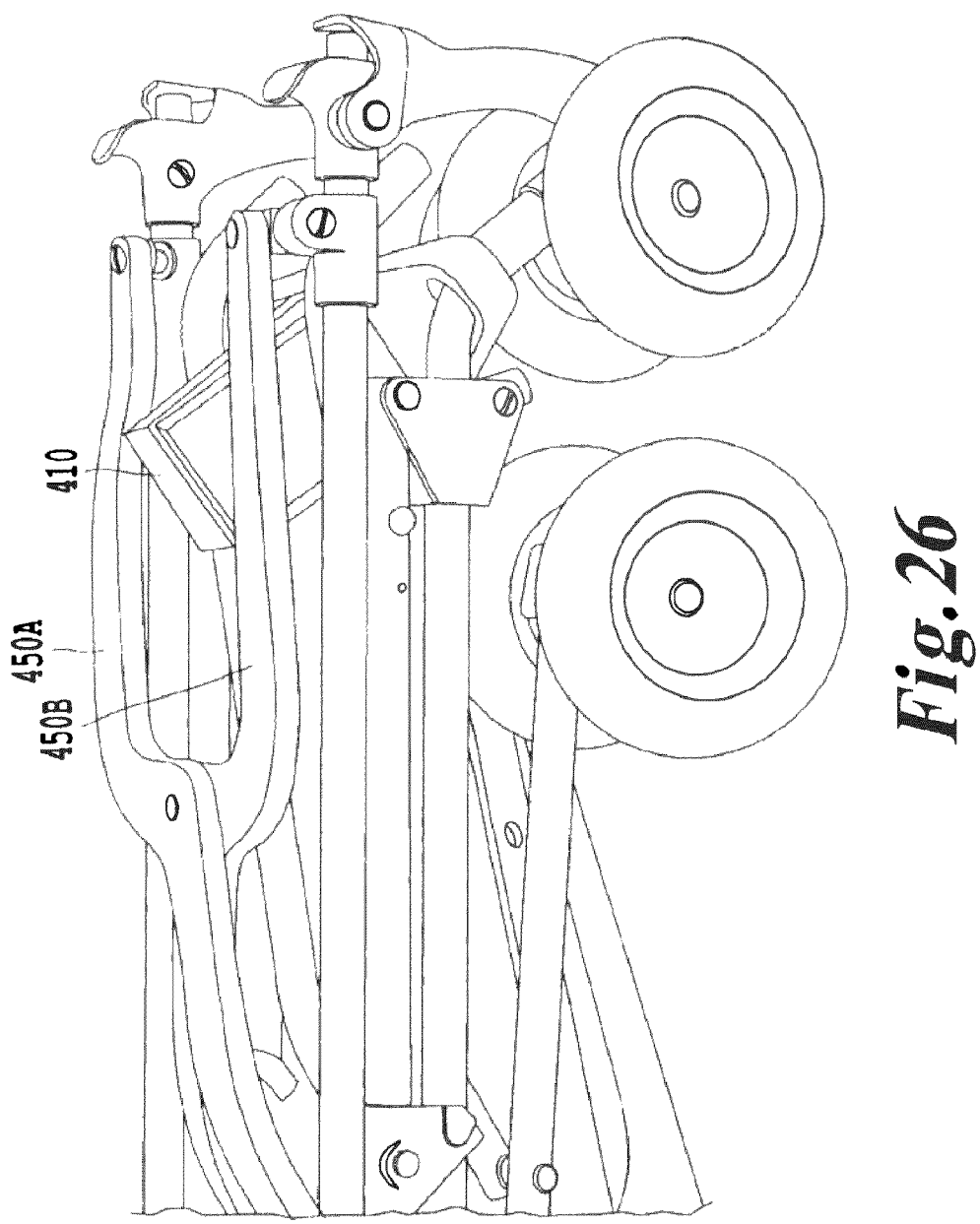
FIG. 26 is a schematic front view of a portion of the exemplary embodiment of the stroller of FIG. 21 in an folded state.

The stroller 401 also includes the upper X frame members 450A, 450B of upper X frame 450. As can be seen in FIG. 22, the upper X frame members 450A, 450B are bowed apart from one another. In the folded position shown in FIG. 26, the top portions of upper X frame members 450A, 450B are substantially parallel. Thus, the footrest 410 can extend through the space between the upper X frame members 450A, 450B without contacting the upper X frame members 450A, 450B. This also helps prevent the footrest 410 from causing wear on the seat 460.

As can be seen in FIG. 23, the hinge 434 is positioned offset above the pins 418. Accordingly, the footrest 410 can only rise upward when the stroller 401 is being folded. This prevents the footrest 410 from folding downward.

FIG. 27 is another view of another exemplary embodiment of the stroller 401 having a seat 460 and a canopy frame 470 attached thereto. The canopy 470 is attached to pivot frame 18. In FIG. 27, the canopy material is removed from the canopy frame 470 to more clearly show the seat 460. However, a person of ordinary skill in the art would understand that canopy material could be fitted to the canopy frame 470 in a conventional manner.

Figure 28:
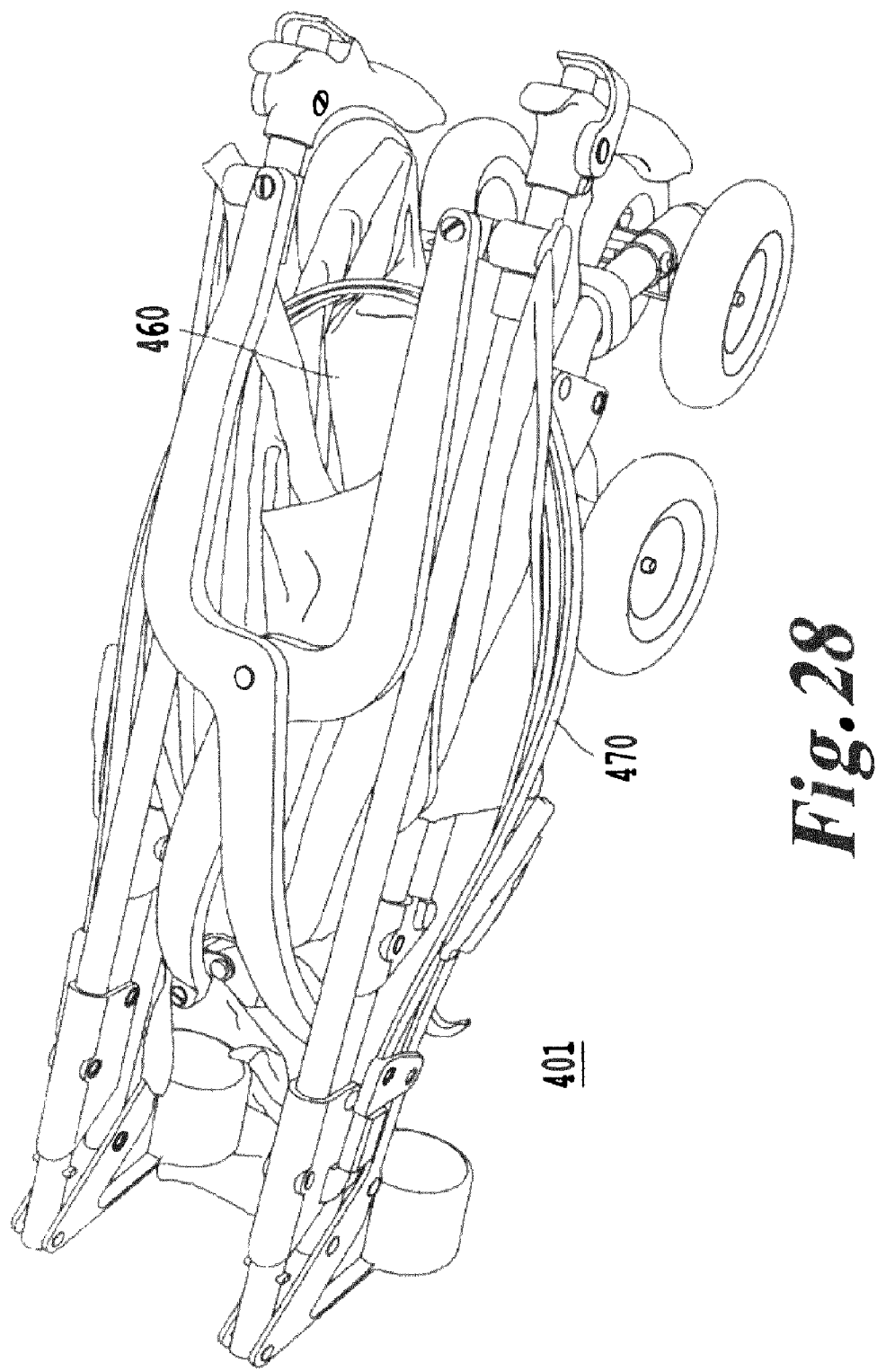
FIG. 28 is a schematic front view of the exemplary embodiment of the stroller of FIG. 27 in a folded state.

FIG. 28 shows the stroller 401 in a folded position. As the raised portions of the footrest 410 have traveled down the slots 430, the footrest 410 does not protrude upwards very much. The seat 460 is folded between the lower X frame members 52A, 52B and the upper X frame members 450A, 450B. Thus, the seat 460 is not stressed by the footrest 410. Further, the canopy 470 can be easily folded and is not impeded by the footrest 410.

While this invention has been described in conjunction with exemplary embodiments outlined above, it is evident that many alternatives, modifications, and variations will be apparent to those skilled in the art. Accordingly, the exemplary embodiments of this invention, as set forth above, are intended to be illustrative, not limiting. Various changes may be made without departing from the spirit and scope of the invention.

The invention claimed is:

1. A folding chair, comprising:
two front legs and two rear legs configured to support the chair in an upright position;
a footrest positioned between the two front legs, the footrest including base portions attached to the two front legs and raised portions positioned between the base portions, and the base portions include pins configured to move in slots in the raised portions;
two handle frames;
two first upper sliders configured to slide along the handle frames;
an upper X frame including two upper X frame members pivotally connected to each other at respective intermediate portions, each upper X frame member being pivotally connected to one of the first upper sliders and to one of the rear legs;
two second lower sliders attached to side frames and configured to slide along the front legs;
a lower X frame including two lower X frame members pivotally connected to each other at respective intermediate portions, each lower X frame member being pivotally connected to one of the second lower sliders and attached to one of the rear legs; and
two pivot frames linked to the second sliders and pivotally attached to the rear legs,
wherein, when the folding chair is in an unfolded position, the pins of the base portions abut against outer edges of the slots and, when the folding chair is in a folded position, the pins of the base portions abut against inner edges of the slots.

2. The folding chair according to claim 1, wherein the base portions of the footrest are fixedly attached to the two front legs at outer ends of the base portions and, when the folding chair is in the folded position, inner ends of the base portions abut.

3. The folding chair according to claim 1, wherein each of the base portions of the footrest includes one of the pins positioned in one of the slots of the raised portion.

4. The folding chair according to claim 1, wherein the base portions of the footrest are positioned lower than the raised portions in a vertical direction.

5. The folding chair according to claim 1, wherein the raised portions are attached via a hinge, and an axis of the hinge is offset and above axes of the pins such that the footrest folds in an upward direction.

6. The folding chair according to claim 1, wherein each of the slots is seven-sixteenths of an inch in length.

7. A folding chair, comprising:
two front legs and two rear legs configured to support the chair in an upright position;
a footrest positioned between the two front legs, the footrest including base portions attached to the two front legs and raised portions positioned between the base portions, and the base portions include pins configured to move in slots in the raised portions;
two handle frames;
two first upper sliders configured to slide along the handle frames;
an upper X frame including two upper X frame members pivotally connected to each other at respective intermediate portions, each upper X frame member being pivotally connected to one of the first upper sliders and to one of the rear legs;
two second lower sliders attached to side frames and configured to slide along the front legs;
a lower X frame including two lower X frame members pivotally connected to each other at respective intermediate portions, each lower X frame member being pivotally connected to one of the second lower sliders and attached to one of the rear legs;
two pivot frames linked to the second sliders and pivotally attached to the rear legs; and
lateral portions pivotally attached to the side frames and the rear legs; and
a seat attached to the lateral portions and the two handle frames, wherein the seat is folded when the folding chair is in a folded position.

8. The folding chair according to claim 7, further comprising:
a canopy frame attached to the two pivot frames, wherein the canopy frame is folded when the folding chair is in the folded position.

9. A method of folding a chair including two front legs and two rear legs configured to support the chair in an upright position, a footrest positioned between the two front legs, the footrest including base portions attached to the two front legs and raised portions positioned between the base portions, and the base portions include pins configured to move in slots in the raised portions, two handle frames, two first upper sliders configured to slide along the handle frames, an upper X frame including two upper X frame members pivotally connected to each other at respective intermediate portions, each upper X frame member pivotally connected to one of the first upper sliders and to one of the rear legs, two second lower sliders attached to side frames and configured to slide along the front legs, a lower X frame including two lower X frame members pivotally connected to each other at respective intermediate portions, each lower X frame member pivotally connected to one of the second lower sliders and attached to one of the rear legs, and two pivot frames linked to the second sliders and pivotally attached to the rear legs, the method comprising:

detaching the two lower X frame members from the rear legs;

pivoting a top portion of the handle frames toward a front of the chair;

sliding the first upper sliders upward along the handle frames and sliding the second lower sliders downward along the front legs so that the handle frames, the front legs, and the rear legs become substantially parallel in their length directions;

collapsing the upper X frame members and the lower X frame members about their intermediate pivot points so that the two handle frames move toward each other, the two front legs move toward each other, and the two rear legs move toward each other; and rotating the two handle frames towards front wheels attached to the front legs until inner ends of the base portions of the footrest abut.

\* \* \* \* \*